United States Patent
Dry et al.

(10) Patent No.: US 10,604,032 B2
(45) Date of Patent: Mar. 31, 2020

(54) TRANSLATABLE SEATING ASSEMBLY

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US); Kevin Wayne Preuss, Berkley, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 15/801,712

(22) Filed: Nov. 2, 2017

(65) Prior Publication Data

US 2019/0126786 A1   May 2, 2019

(51) Int. Cl.
| | |
|---|---|
| *B60N 2/08* | (2006.01) |
| *B60N 2/01* | (2006.01) |
| *B60N 2/06* | (2006.01) |
| *B60N 2/005* | (2006.01) |
| *B60N 2/02* | (2006.01) |
| *B60N 2/14* | (2006.01) |
| *B60R 16/037* | (2006.01) |

(52) U.S. Cl.
CPC .......... *B60N 2/0806* (2013.01); *B60N 2/005* (2013.01); *B60N 2/01* (2013.01); *B60N 2/0224* (2013.01); *B60N 2/06* (2013.01); *B60N 2/062* (2013.01); *B60N 2/14* (2013.01); *B60R 16/037* (2013.01); *B60N 2002/0236* (2013.01)

(58) Field of Classification Search
CPC .... B60N 2/0224; B60N 2/0806; B60N 2/005; B60N 2/0856; B60N 2/06; B60N 2/01; B60N 2/14; B60N 2/0722; B60N 2/062; B60N 2002/0236; B60R 16/037
USPC ................ 296/65.15, 65.13; 297/344.1, 151, 297/411.36, 344.18; 248/429, 408; 403/109.3, 324
See application file for complete search history.

(56) References Cited

U.S. PATENT DOCUMENTS

| | | | | |
|---|---|---|---|---|
| 3,443,784 | A | * 5/1969 | Walkinshaw | ............ A47C 3/26 248/408 |
| 4,184,656 | A | 1/1980 | Wakeley | |
| 4,550,933 | A | * 11/1985 | Patterson | ................ B60R 22/20 280/801.2 |
| 4,571,001 | A | * 2/1986 | Hakansson | ........... B60R 22/203 280/808 |
| 5,368,355 | A | * 11/1994 | Hayden | .............. B60N 2/01591 296/65.13 |

(Continued)

FOREIGN PATENT DOCUMENTS

| | | |
|---|---|---|
| DE | 69920043 T2 | 9/2005 |
| DE | 102009033797 A1 | 3/2010 |

(Continued)

*Primary Examiner* — Milton Nelson, Jr.
(74) *Attorney, Agent, or Firm* — David Coppiellie; Price Heneveld LLP

(57) ABSTRACT

A seating assembly includes an anchor that has a post that is surrounded by a main body. The post extends above and below the main body and terminates in an upper head and a lower head. The post surrounds a locking pin that can be actuated within the post. An electrical connector extends outward from the anchor.

15 Claims, 20 Drawing Sheets

(56) References Cited

U.S. PATENT DOCUMENTS

| | | | |
|---|---|---|---|
| 6,216,995 B1 * | 4/2001 | Koester | B60N 2/0228 |
| | | | 248/429 |
| 6,270,140 B1 | 8/2001 | Opfer et al. | |
| 6,655,720 B2 * | 12/2003 | Rampen | E05B 65/0876 |
| | | | 292/163 |
| 7,252,319 B2 | 8/2007 | Toyota et al. | |
| 8,152,231 B2 | 4/2012 | Larsen et al. | |
| 8,169,311 B1 | 5/2012 | Breed | |
| 8,668,181 B2 * | 3/2014 | Dazet | B60P 7/0807 |
| | | | 244/118.1 |
| 9,248,759 B2 | 2/2016 | Brand et al. | |
| 9,376,044 B2 | 6/2016 | Fujita et al. | |
| 9,688,164 B2 | 6/2017 | Vikstrom et al. | |
| 2009/0014584 A1 | 1/2009 | Rudduck et al. | |
| 2017/0166091 A1 | 6/2017 | Cziomer et al. | |
| 2019/0184859 A1 * | 6/2019 | Flick | B60N 2/0705 |

FOREIGN PATENT DOCUMENTS

| | | | |
|---|---|---|---|
| EP | 0615879 A1 | 9/1994 | |
| JP | WO2013161620 A1 | 12/2015 | |

* cited by examiner

TRANSLATABLE SEATING ASSEMBLY

CROSS REFERENCE TO RELATED APPLICATIONS

The present application relates to U.S. patent application Ser. No. 15/801,741, filed Nov. 2, 2017, entitled DRIVE CABLE FOR A SEATING ASSEMBLY, and U.S. patent application Ser. No. 15/801,761, filed Nov. 2, 2017, entitled VEHICLE HAVING A RAIL SYSTEM.

FIELD OF THE DISCLOSURE

The present disclosure generally relates to a seating assembly. More specifically, the present disclosure relates to a seating assembly capable of translating to various positions.

BACKGROUND OF THE INVENTION

Vehicles are often provided with seating assemblies that can be adjusted for occupant comfort. Some seating assemblies in vehicles are capable of translation in fore-aft or side-to-side directions. However, there is a need for reconfigurable seating assemblies in vehicles that are capable of translation to various locations within a cabin of the vehicle.

SUMMARY OF THE INVENTION

According to a first aspect of the present disclosure, a seating assembly includes an anchor that has a post that is surrounded by a main body. The post extends above and below the main body and terminates in an upper head and a lower head. The post surrounds a locking pin that can be actuated within the post. An electrical connector extends outward from the anchor.

Embodiments of the first aspect of the present disclosure can include any one or a combination of the following features:
  the anchor engages with a rail system;
  the rail system includes a low friction portion;
  the rail system further includes a plurality of positioning apertures that are configured to receive the locking pin;
  the rail system includes a conductor that is provided with electrical power and is configured to receive the electrical connector;
  the electrical connector is generally circular in shape such that the electrical connector remains coupled to the conductor regardless of a rotational position of the anchor;
  the seating assembly further includes a first spring positioned between the upper head and the main body and configured to aid in actuating the locking pin;
  the seating assembly further includes a second spring that is positioned at a lower region of the locking pin and is configured to bias the locking pin in a downward direction;
  the second spring is positioned within the lower head of the post; and
  the locking pin further includes a shoulder that engages with an underside of the second spring.

According to a second aspect of the present disclosure, a seating assembly includes an anchor that has a post that is surrounded by a main body. The post extends above and below the main body and terminates in an upper head and a lower head. The post surrounds a locking pin that can be vertically actuated within the post. An electrical connector extends outward from the anchor such that an electrical connection is established with the seating assembly.

Embodiments of the second aspect of the present disclosure can include any one or a combination of the following features:
  the seating assembly further includes an alcove in at least one side of the lower head of the anchor;
  the alcove receives a data cable that is configured to send and receive data relating to the positioning of the seating assembly; and
  the alcove further includes one or more data readers that are operably coupled to a data path such that data relating to a configuration of the seating assembly is transmitted to and received from the data cable.

According to a third aspect of the present disclosure, a seating assembly includes an anchor that has a post that is surrounded by a main body. The post extends above and below the main body and terminates in an upper head and a lower head. The post surrounds a locking pin that can be actuated within the post. A first spring is positioned between the upper head and the main body and is configured to aid in actuating the locking pin.

Embodiments of the third aspect of the present disclosure can include any one or a combination of the following features:
  the anchor engages with a rail system that has a plurality of positioning apertures that are configured to receive the locking pin;
  the seating assembly further includes a second spring positioned at a lower region of the locking pin and configured to bias the locking pin in a downward direction;
  the second spring is positioned within the lower head of the main body;
  the locking pin further includes a shoulder that engages with an underside of the second spring; and
  the seating assembly further includes an alcove in at least one side of the lower head of the anchor, wherein the alcove receives a data cable that is configured to send and receive data relating to the positioning of the seating assembly, and wherein the alcove includes one or more data readers that are operably coupled to a data path such that data relating to a configuration of the seating assembly is transmitted to and received from the data cable.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
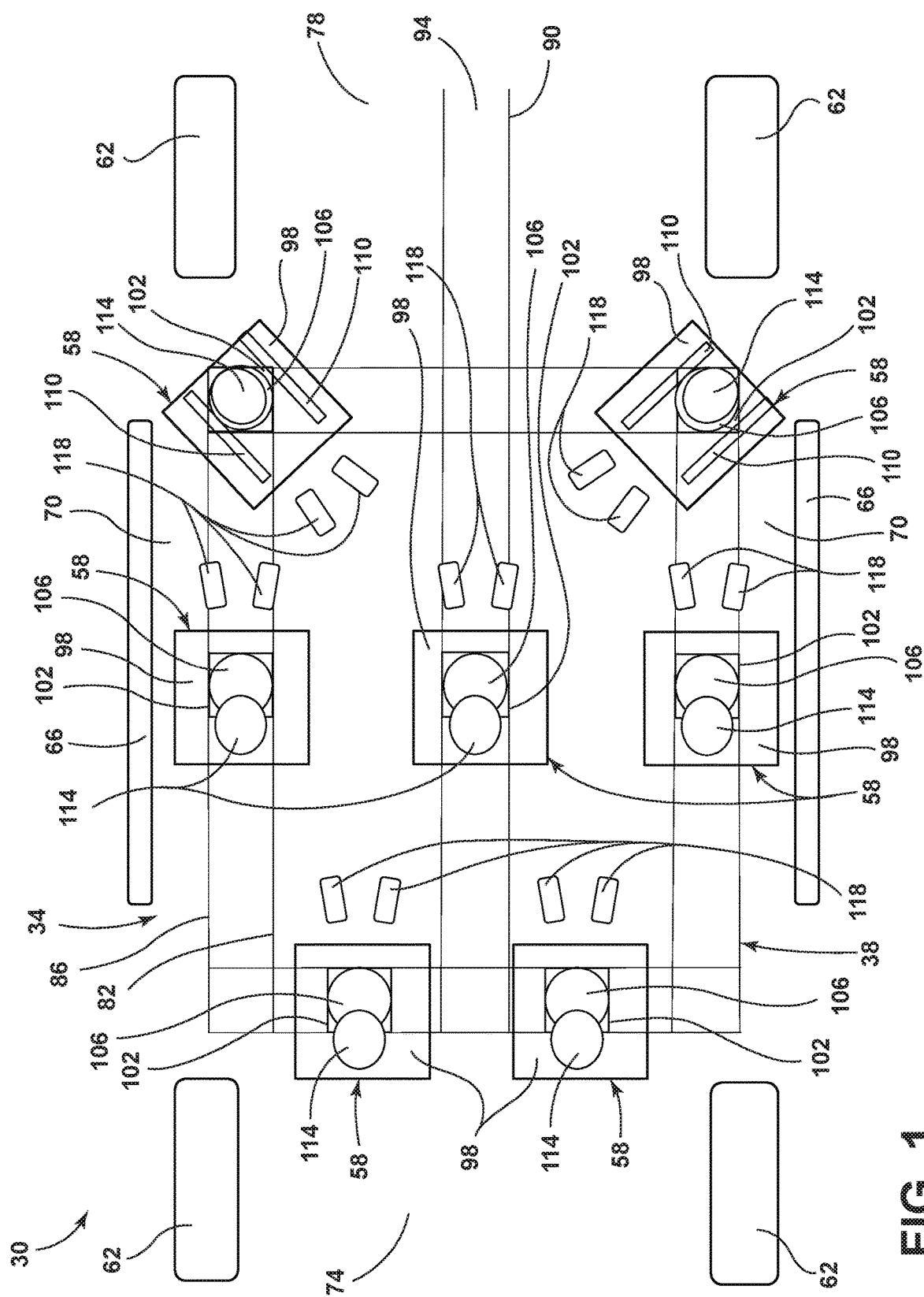
FIG. 1 is a top view of a cabin of a vehicle illustrating a rail system and seating assemblies, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-20, a vehicle 30 has a cabin 34 that includes a rail system 38 coupled to a floor pan 42 and a floor covering 46 that includes a bridge 50. The vehicle 30 further includes one or more anchors 54 that couple a seating assembly 58 to the rail system 38 and are configured to displace the bridge 50 as the anchors traverse the rail system 38.

Figure 2:
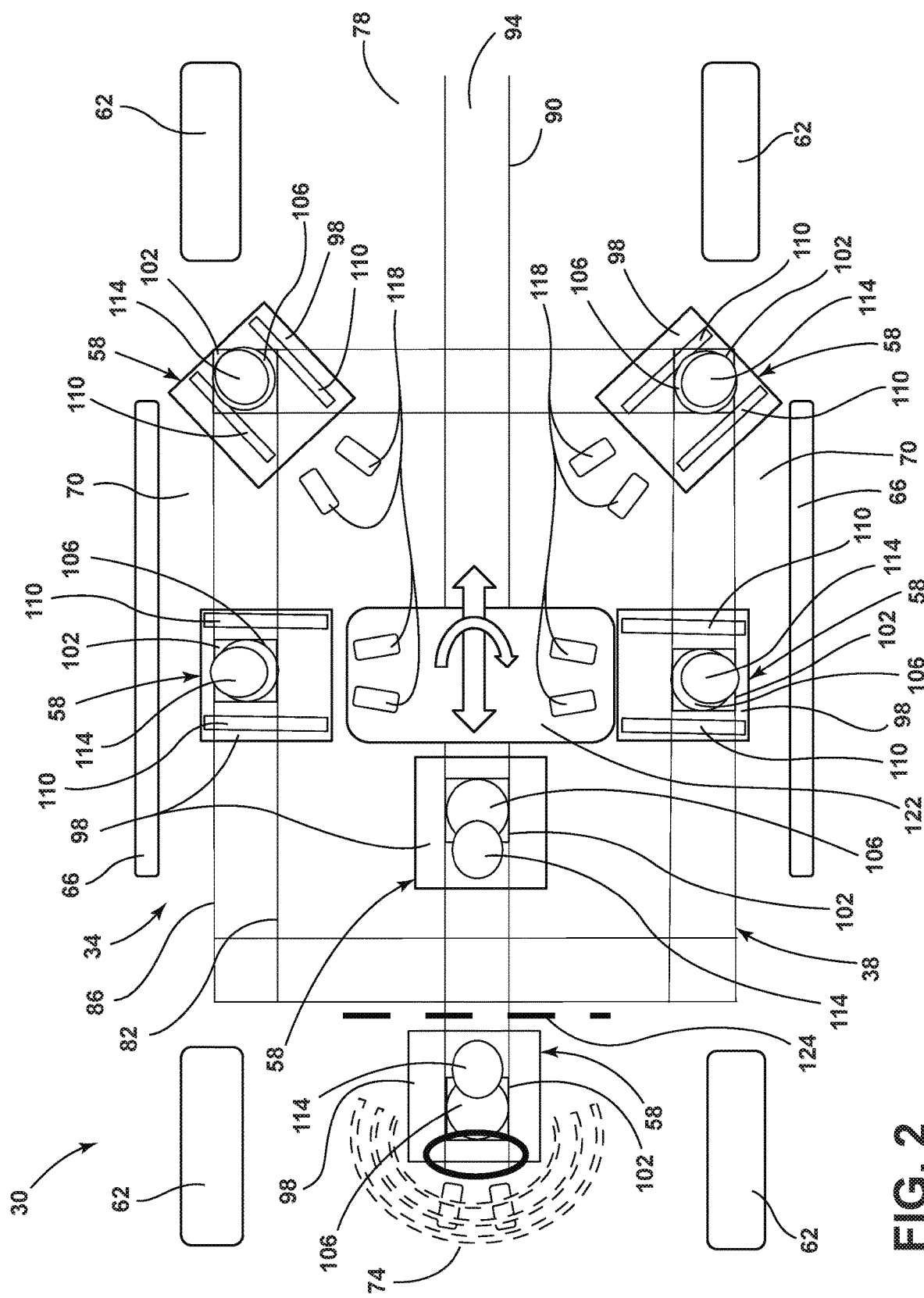
FIG. 2 is a top view of a cabin of a vehicle illustrating the rail system and seating assemblies, according to another embodiment.

Referring again to FIGS. 1 and 2, the vehicle 30 may be a wheeled motor vehicle provided with a plurality of wheel and tire assemblies 62 and one or more access doors 66. For example, there may be four wheel and tire assemblies 62 with one wheel and tire assembly 62 positioned approximately at each corner of the vehicle 30. The access doors 66 may be positioned on one or more sides 70 of the vehicle 30. The access doors 66 may additionally or alternatively be positioned on a front 74 of the vehicle 30 and/or a back 78 of the vehicle 30. According to some embodiments, the vehicle 30 may be an autonomous vehicle (FIG. 1). In alternative embodiments, the vehicle 30 may be controlled by an operator or driver (FIG. 2). The rail system 38 may define a track within a cabin 34 of the vehicle 30. The rail system 38 may include an inner track 82 and an outer track 86. In some embodiments, the rail system 38 may further include a load-and-unload track 90. The load-and-unload track 90 may extend between the sides 70 of the vehicle 30 and/or between the front 74 and back 78 of the vehicle 30. The load-and-unload track 90 may include an open end 94 that facilitates coupling of the seating assembly 58 to the rail system 38. In embodiments that do not include the load-and-unload track 90, the seating assembly 58 may be directly coupled to at least one of the inner track 82 and the outer track 86 without utilizing the open end 94 of the rail system 38.

Referring further to FIGS. 1 and 2, the seating assembly 58 includes a comfort structure 98 and a seat base 102. The seat base 102 operably couples the seating assembly 58 to the rail system 38. The seat base 102 may be operably coupled to the comfort structure 98 by a pivot mechanism 106. The seating assembly 58 may include armrests 110. An occupant 114 of the seating assembly 58 may pivot the seating assembly 58 about a vertical axis, as facilitated by the pivot mechanism 106, such that the occupant 114 and their feet 118 are able to face any direction within the cabin 34 of the vehicle 30 that they desire. The pivot mechanism 106 enables the seating assembly 58 to be placed in a rotational position desired by the occupant 114 regardless of a translational position of the seating assembly 58 on the rail system 38. The rail system 38 may additionally accept furniture and/or items that may be useful or desired by occupants 114 of the cabin 34. For example, a table 122 may operably couple with the rail system 38 in a similar manner to that of the seating assembly 58. The table 122 may traverse various locations and/or positions along the rail system 38. The table may rotate about a vertical axis, move laterally, move longitudinally, and/or assume various pitch angles relative to the floor pan 42 of the vehicle 30. In some embodiments, the table 122 may be provided by the rear surface of the seating assembly 58 when the seating assembly 58 is in a folded position. The cabin 34 of the vehicle 30 may be provided with a privacy wall 124 that separates the driver or operator from the passenger area of the vehicle 30.

Figure 3:
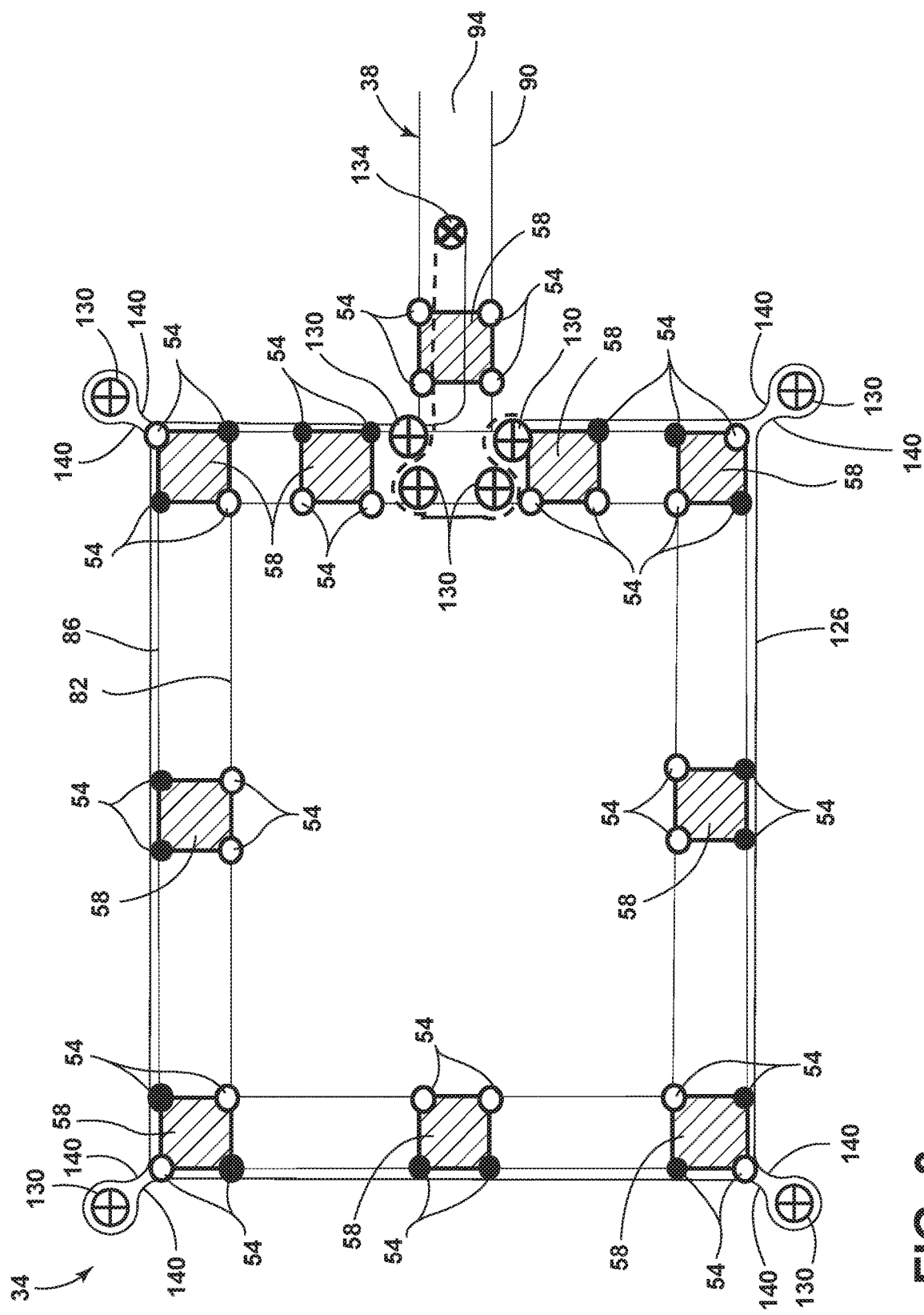
FIG. 3 is a top view of the rail system illustrating movement of the seating assemblies along the rail system, according to one embodiment.
Figure 4:
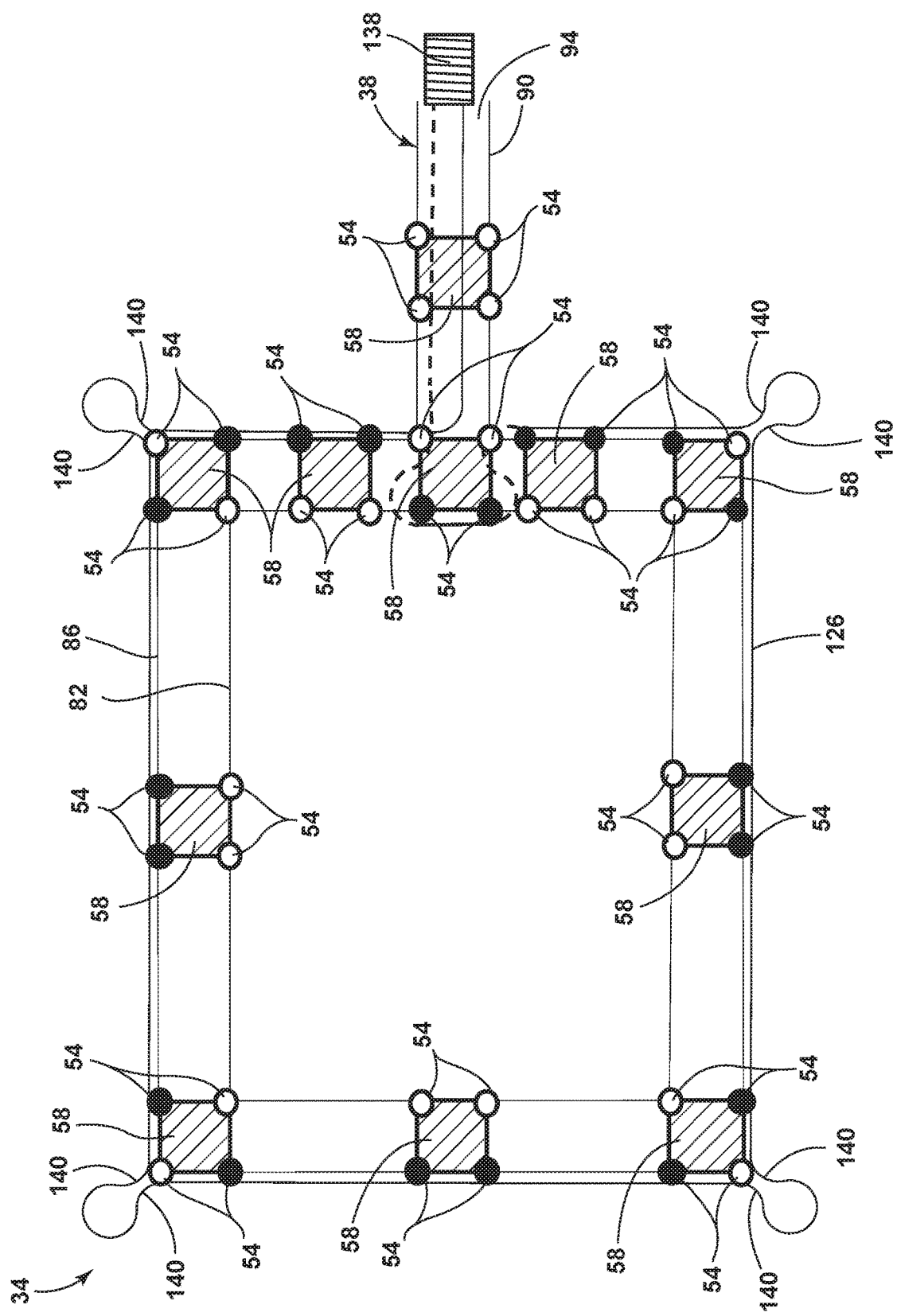
FIG. 4 is a top view of the rail system illustrating movement of the seating assemblies along the rail system, according to another embodiment.

Referring to FIGS. 3 and 4, the rail system 38 includes the inner track 82 and the outer track 86. In some embodiments, the rail system 38 further includes the load-and-unload track 90 and the open end 94. The load-and-unload track 90 may extend from one side of the rail system 38, as shown here. Alternatively, the load-and-unload track 90 may extend from one side of the rail system 38 to an opposite side of the vehicle 30 (FIG. 1) or the rail system 38 may intersect the load-and-unload track 90 as the load-and-unload track 90 traverses the vehicle 30 from one side to another. The rail system 38 may be equipped with a drive cable 126. In some embodiments, the drive cable 126 is generally associated with the outer track 86 of the rail system 38. The drive cable 126 may engage with one or more pulleys 130 that are positioned at various locations around the rail system 38. In some embodiments, the pulleys 130 may be positioned at directional transition points along the rail system 38. For example, the pulleys 130 may be positioned at corners of the rail system 38, at the junction of the load-and-unload track 90 with the rail system 38, and/or can be associated with positions on the rail system 38 where the seating assembly 58 changes directions as the seating assembly 58 is traversing the track of the rail system 38.

Referring again to FIGS. 3 and 4, the drive cable 126 may be operably coupled to a motor 134 and a control module 138. The drive cable 126 may be routed around a tensioner, such as a clockwise tensioner or a counterclockwise tensioner that aids in the engagement between the drive cable 126 and the pulleys 130. The drive cable 126 may additionally be routed through one or more travel guides 140 that aid in directing the drive cable 126 onto and off of the rail system 38 so that the drive cable 126 can engage with the pulleys 130. The travel guides 140 may aid in preventing the drive cable 126 from decoupling from the rail system 38. The travel guides 140 may provide an elevation change to the drive cable 126 that may be beneficial, for example, at the junction of the load-and-unload track 90 and the remainder of the rail system 38. The drive cable 126 may be a continuous loop of material. The drive cable 126 may be routed in a manner that refrains from having the drive cable 126 cross a center of the load-and-unload track 90. By refraining from allowing the drive cable 126 to cross the center of the load-and-unload track 90, as the seating assembly 58 is loaded onto the rail system 38 the seating assembly 58 may avoid premature engagement with the drive cable 126. For example, as the seating assembly 58 is loaded onto the rail system 38 (e.g., the load-and-unload track 90) the drive cable 126 may be moved to one side of the load-and-unload track 90 thereby allowing the seating assembly 58 to be loaded on to the rail system 38 and cross above the drive cable 126. In the depicted embodiments, the rail system 38 is generally rectangular, includes four corners, and is equipped with the load-and-unload track 90. Each of the four corners of the rail system 38 is equipped with one of the pulleys 130 positioned outward of the outer track 86. Additionally, the pulleys 130 are positioned at the junction between the outer track 86 and the load-and-unload track 90. The rail system 38 may be further equipped with additional pulleys 130 that are positioned on the inner track 82 and generally correspond with the pulleys 130 that are positioned at the junction of the outer track 86 and the load-and-unload track 90. By so positioning the pulleys 130, the seating assembly 58 may traverse the rail system 38 smoothly by selectively engaging the drive cable 126 while the control module 138 engages the motor 134 to be activated.

Referring further to FIGS. 3 and 4, the seating assembly 58 may be equipped with one or more of the anchors 54. The anchors 54 may be positioned to generally correspond with each of four corners of the seating assembly 58. In general, it may be beneficial that the seating assembly 58 is equipped with at least one of the anchors 54 that operably couples to each of the inner track 82 and the outer track 86. It may be preferable for the seating assembly 58 to be equipped with a plurality of anchors 54 that engage with each of the inner track 82 and the outer track 86 (e.g., two anchors 54 for each of the inner track 82 and the outer track 86 such that the seating assembly 58 is equipped with four of the anchors 54). The varied shading of the anchors 54 indicates an engaged state or a disengaged state of the anchor 54 to the drive cable 126, according to one embodiment. The anchors 54 are shown with different levels of shading that communicate whether the anchor 54 is engaged or disengaged from the rail system 38 and the drive cable 126. The anchors 54 that are unshaded represent anchors 54 that are engaged with the rail system 38, locked in place (e.g., by a locking pin), and disengaged from the drive cable 126. The anchors 54 that are fully shaded represent anchors 54 that are engaged with the rail system 38, unlocked from the rail system 38, and engaged to the drive cable 126.

Figure 5:
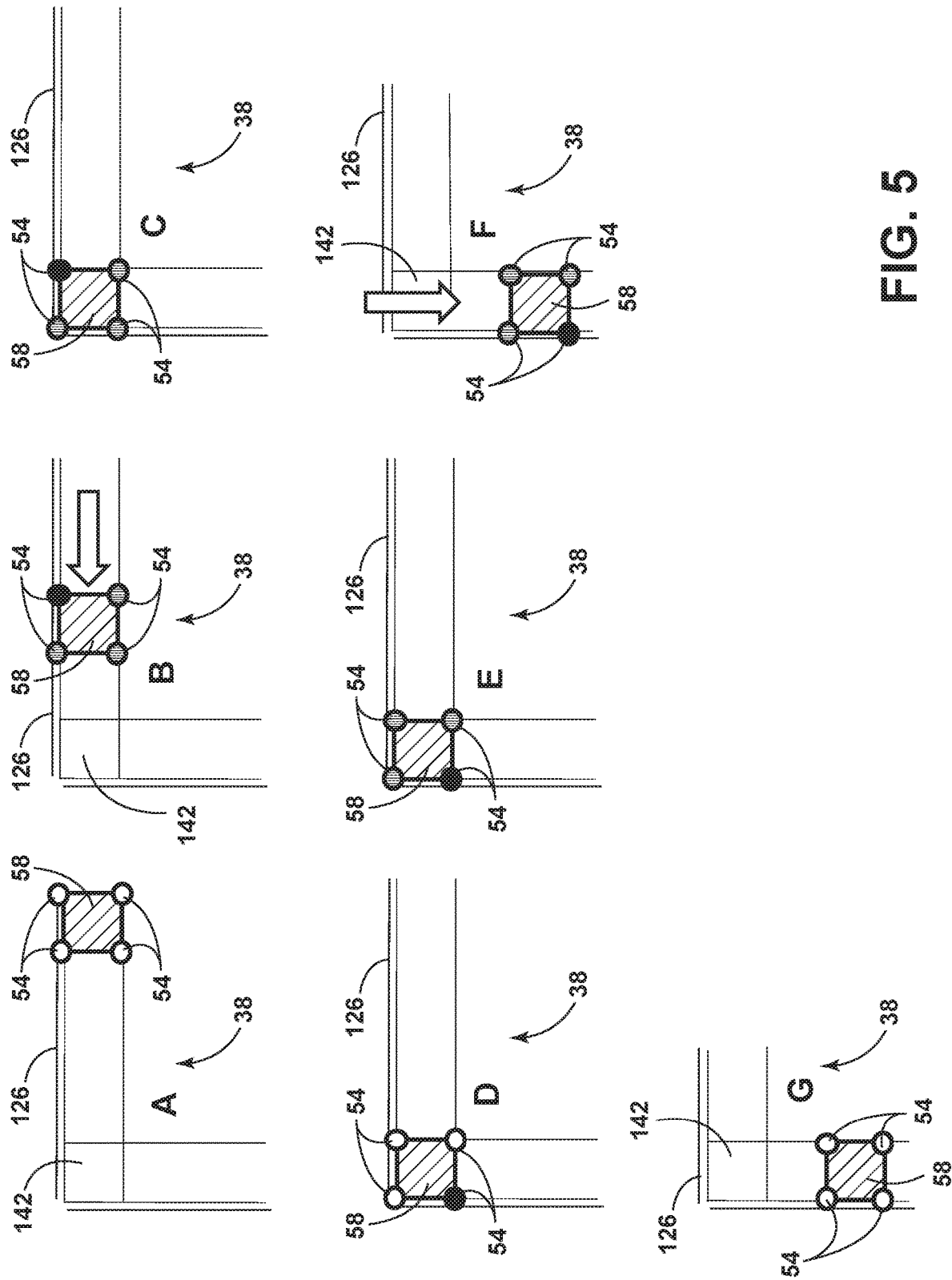
FIG. 5 is a top view of a section of the rail system illustrating one of the seating assemblies traversing the rail system through a corner, according to one embodiment.

Referring now to FIG. 5, the seating assembly 58 is shown operably coupled to the rail system 38 by the anchors 54. More specifically, the seating assembly 58 is shown in positions A-G and depicts an example of how the seating assembly 58 may traverse the rail system 38 by selectively engaging the anchors 54 with the drive cable 126. The anchors 54 are shown with different levels of shading that communicate whether the anchor 54 is engaged or disengaged from the rail system 38 and the drive cable 126. The anchors 54 that are unshaded, such as those in position A and G, represent anchors 54 that are engaged with the rail system 38, locked in place (e.g., by a locking pin), and disengaged from the drive cable 126. The anchors 54 that are partially shaded with vertical lines represent anchors 54 that are engaged with the rail system 38, are unlocked from the rail system 38 (e.g., by raising the locking pin), and are disengaged from the drive cable 126. The anchors 54 that are fully shaded, such as the anchor 54 at the upper right of the seating assembly 58 in position B, represent anchors 54 that are engaged with the rail system 38, unlocked from the rail system 38, and engaged to the drive cable 126. The pulleys 130 have been omitted from FIG. 5; however the pulleys 130 are utilized in the embodiment depicted in a manner similar to that discussed in FIGS. 3 and 4. FIG. 5 depicts movement of the seating assembly 58 along the rail system 38 and a right angle transition of the seating assembly 58 from a first portion of the rail system 38 to a second portion of the rail system 38 through selective engagement of the anchors 54 with the rail system 38 and the drive cable 126.

Referring again to FIG. 5, position A of the seating assembly 58 presents a stationary position of the seating assembly 58 where the seating assembly 58 is secured to the rail system 38 by the locking pin such that the seating assembly 58 does not inadvertently or unintentionally traverse the rail system 38 (e.g., during vehicle maneuvers, collision events, etc.). The seating assembly 58 in position A is generally ready to receive an occupant. The seating assembly 58 of position D has unlocked each of the anchors 54 from the rail system 38 and engaged one of the anchors 54 to the drive cable 126 such that the seating assembly 58 may begin to traverse the rail system 38. The seating assembly 58 may traverse the rail system 38 while occupied or unoccupied; however it may be beneficial to limit the traversal of the seating assembly 58 on the rail system 38 to when the seating assembly 58 is unoccupied in an effort to reduce the risk of injury to an occupant. In the depicted embodiment, position B engages the anchor 54 that is positioned at an upper right corner of the seating assembly 58 to the drive cable 126 and initiates traversal of the rail system 38. By engaging the anchors 54 as depicted in position B, the potential for movement impairments of the seating assembly 58 may be decreased. For example, if position B engaged the anchor 54 positioned at the upper left of the seating assembly 58 to the drive cable 126, then a situation may arise that as the seating assembly 58 approaches the pulleys 130 that are positioned at the corners of the rail system 38, and then a binding or movement impairment may occur as the drive cable engaged anchor 54 attempts to follow the path of the drive cable 126 around the pulley 130 and meets resistance from the structure of the rail system 38, the travel guides 140 (FIG. 4), and/or the pulleys 130.

Referring further to FIG. 5, as the seating assembly 58 reaches a corner 142 of the rail system 38, the engagement configuration of the anchors 54 transitions to that shown in position C. The seating assembly 58 of position C provides the anchors 54 as unlocked from the rail system 38 with one of the anchors 54 engaged with the drive cable 126. In the depicted embodiment, the seating assembly 58 arrives in the corner 142 of the rail system 38 and comes to at least a momentary stop. Once the seating assembly 58 has reached the corner 142, the engagement configuration of the anchors 54 may be adjusted if movement of the seating assembly 58 along the second portion of the rail system 38 is desired. At position D, the seating assembly 58 is transitioning from a locked configuration to an in-motion configuration of the anchors 54. For example, an occupant may have been sitting in the seating assembly 58 and desired to sit in the corner of the rail system 38; however a new configuration of the cabin 34 of the vehicle 30 is desired. As the seating assembly 58 transitions from the first portion of the rail system 38 to the second portion, the anchors 54 may assume the locked position to the rail system 38 while being disengaged from the drive cable 126 to prevent unintentional or unintended free movement of the seating assembly 58 along the rail system 38 (e.g., while the vehicle is in motion).

Referring still further to FIG. 5, in position E, the seating assembly 58 prepares to exit the corner 142 of the rail system 38 by providing three of the anchors 54 as unlocked from the rail system 38 and disengaged from the drive cable 126 while the remaining anchor 54 is disengaged from the rail system 38 and engaged with the drive cable 126. Once the anchor 54 engages with the drive cable 126 in position E, then the seating assembly 58 begins to traverse the second portion of the rail system 38 as shown in position F. Position G may be a final desired position of an occupant, accordingly the anchors 54 are each placed in the locked position to the rail system 38 and are disengaged from the drive cable 126. While positions A-G have been described as occurring in a stepwise fashion, it is contemplated that the positions may be traversed in a continuous fashion. One of skill in the art will recognize that variations in the sequence described above may be executed without departing from the concepts disclosed herein. The described and depicted sequence of positions A-G shows one embodiment of how the seating assembly 58 may traverse the corner 142 of the rail system 38. Alternative embodiments of the rail system 38, the anchors 54, and/or the seating assembly 58 are possible without departing from the concepts disclosed herein.

Figure 6:
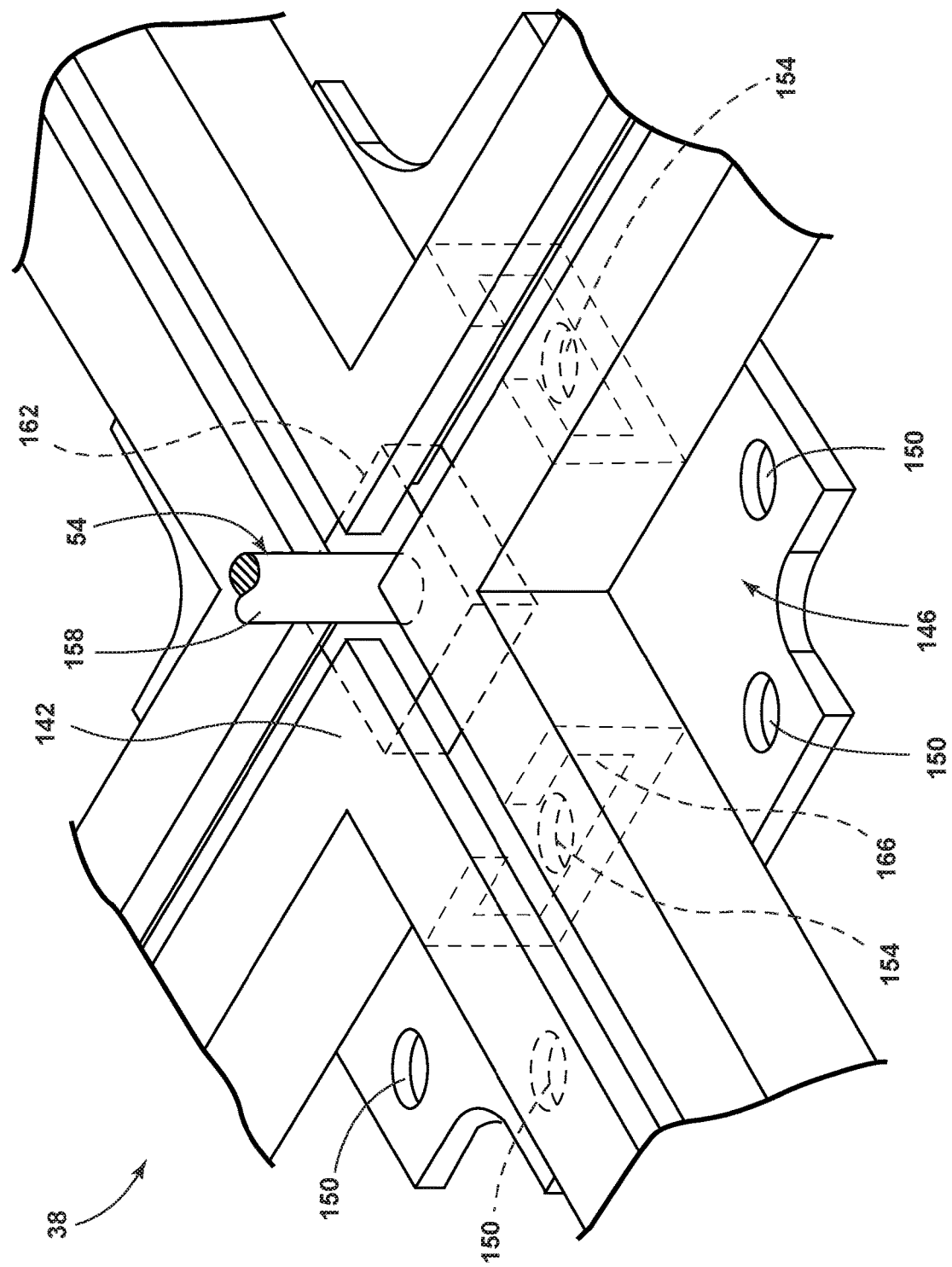
FIG. 6 is top perspective view of the corner of the rail system having an anchor coupled thereto, according to one embodiment.

Referring to FIG. 6, a junction of the rail system 38, such as the corner 142, is shown with the anchor 54 operably coupled with the rail system 38. A junction plate 146 may be positioned below the rail system 38. The junction plate 146 may define floor-coupling apertures 150 that are utilized to couple the junction plate 146 to the floor pan 42 (FIG. 9) or another support structure. The junction plate 146 may be operably coupled to the rail system 38 or may be integrally formed with the rail system 38. In some embodiments, the rail system 38 may be integrally formed with the floor pan 42. The rail system 38 is equipped with a plurality of locking pin apertures 154 that are configured to receive a locking pin 158 of the anchor 54. The locking pin 158 may pass through a foot 162 of the anchor 54 to engage with the locking pin apertures 154. The rail system 38 may define a channel 166. The channel 166 may be configured to resemble an inverted T. The foot 162 of the anchor 54 may generally correspond or be associated with a cross member of the inverted T channel 166 and the locking pin 158 may generally correspond with a vertical leg of the inverted T channel 166.

Figure 7:
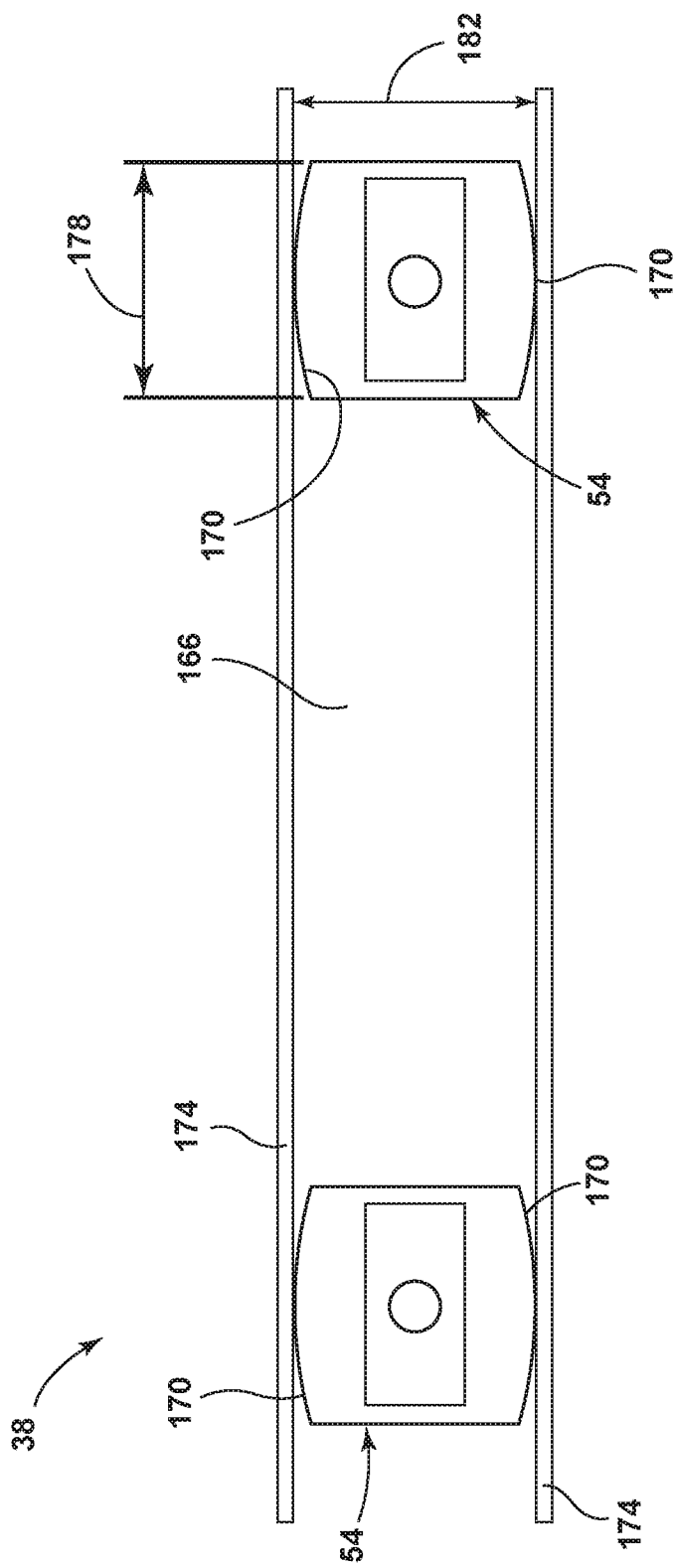
FIG. 7 is a top view of the anchors engaged with the rail system illustrating curved sides of the anchors, according to one embodiment.

Referring now to FIG. 7, the anchor 54 may include one or more curved sides 170. The curved sides 170 may be beneficial in embodiments of the rail system 38 that do not employ orthogonal or generally square track arrangements. For example, in some embodiments the rail system 38 may transition from the first portion to the second portion of the rail system 38 through a generally arcuate turn, such as that shown and discussed below in FIG. 8. The curved sides 170 provide additional clearance between walls 174 of the rail system 38, particularly when the anchors 54 are navigating a turn or corner in the rail system 38. A length 178 of the anchor 54 may generally correspond with the cross member of the inverted T channel 166. A width 182 of the anchor 54 may generally correspond with a distance between the walls 174 of the rail system 38. More specifically, the width 182 of the anchor 54, as measured from the widest point of the anchor 54, may generally correspond with the distance between the walls 174 of the rail system 38.

Figure 8:
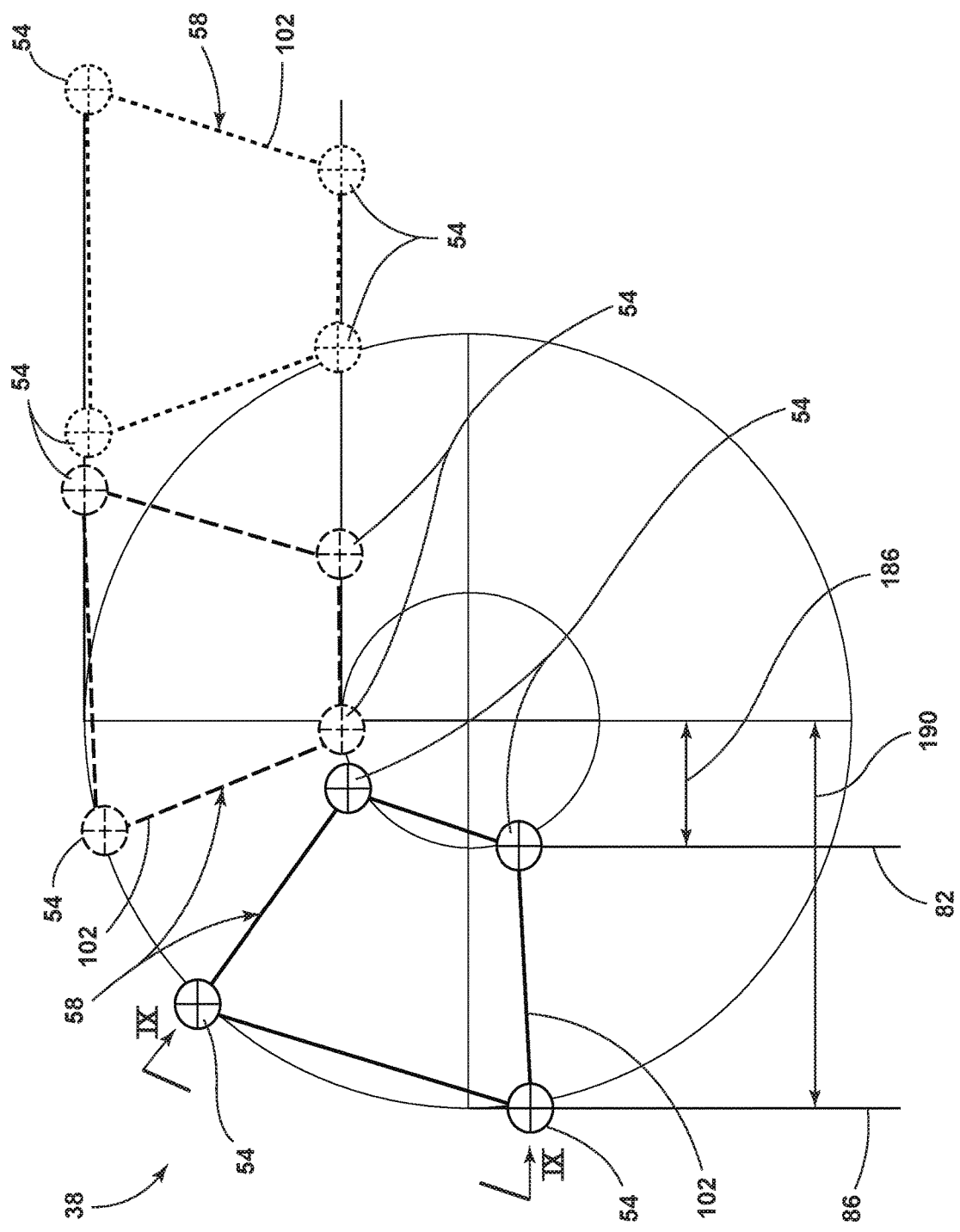
FIG. 8 is a schematic top view of a rounded corner of the rail system illustrating a trapezoidal seat base, according to one embodiment.

Referring to FIG. 8, a schematic view of one embodiment of the rail system 38 is shown with a rounded corner. The seating assembly 58 is shown transitioning from the first portion to the second portion of the rail system 38 through the rounded corner. The rounded corner of the rail system 38 has an inner radius 186 that is associated with the inner track 82 and an outer radius 190 that is associated with the outer track 86. In the depicted embodiment, the seat base 102 of the seating assembly 58 may generally resemble a trapezoidal geometry. A distance between the anchors 54 that are associated with the inner track 82 may be less than a distance between the anchors 54 that are associated with the outer track 86 of the rail system 38. The anchors 54 are configured to engage with the rail system 38 such that sticking or binding of the anchor 54 within the rail system 38 is prevented as the seating assembly 58 traverses the track. The foot 162 (FIG. 6) may be generally rectangular and sized to avoid sticking or binding within the rail system 38. Alternatively, the foot 162 of the anchor 54 may be provided with a geometry that includes rounded edges and/or sides, such as the curved sides 170 depicted in FIG. 7, or the foot 162 may have a generally circular or elliptical cross-section. In general, it may be beneficial to avoid sharp edges on the foot 162 of the anchor 54 such that transitioning between the first portion, the second portion, and other portions of the rail system 38 may be accomplished with a decreased probability of sticking, binding, and/or general misalignment of the anchor 54.

Figure 9:
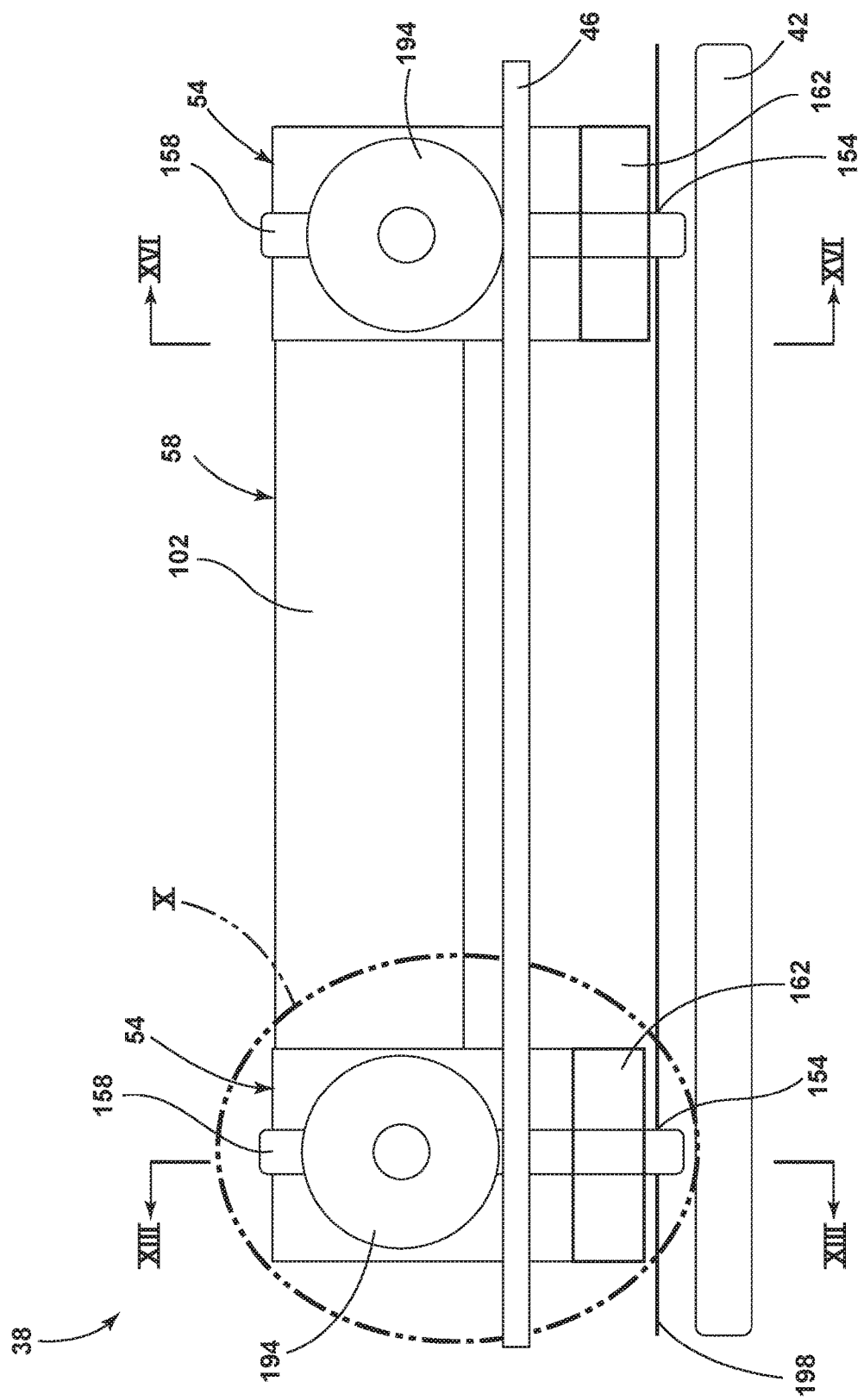
FIG. 9 is a side view of the anchors coupled to the rail system, taken along line IX-IX of FIG. 8, according to one embodiment.

Referring now to FIG. 9, a side of the seating assembly 58 is shown according to one embodiment. The rail system 38 is present in the depicted embodiment; however the rail system 38 has been omitted from FIG. 9 to show further details of the anchors 54. The anchors 54 are operably coupled with the seat base 102 of the seating assembly 58 and extend downward from the seat base 102. The anchors 58 may include a wheel 194 that is configured to interact with the floor covering 46 and aid in smooth movement of the seating assembly 58 as the seating assembly 58 traverses various positions along the rail system 38. The foot 162 of the anchor 54 is positioned proximate a lower end of the anchor 54. The locking pin 158 extends through the anchor 54 along a vertical axis. The locking pin 158 extends below the anchor 54 and engages with the locking pin apertures 154 of the rail system 38. The rail system 38 and/or the floor pan 42 may include a locking pin plate 198. The locking pin plate 198 may be made from folded steel, according to one embodiment.

Figure 10:
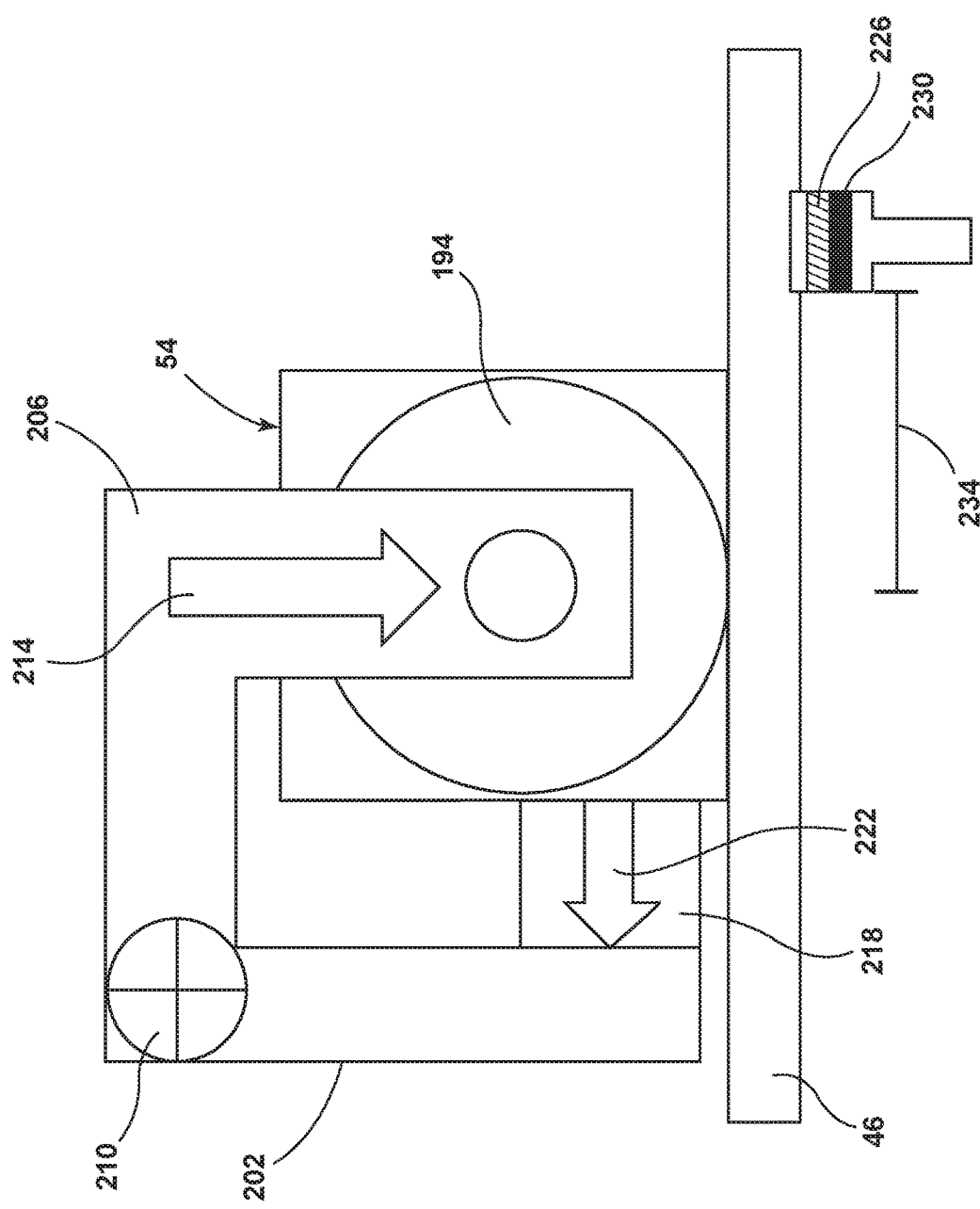
FIG. 10 is a side view of a wheel of the seating assembly, according to one embodiment.

Referring to FIG. 10, the wheel 194 of the anchor 54 may be operably coupled to a load frame 202 by a wheel support arm 206. In some embodiments, the wheel support arm 206 is pivotably coupled to the load frame 202 at a suspension pivot 210. The load frame 202 may be operably coupled to the seat base 102 (FIG. 9) or integrally formed with the seat base 102. A downward force 214 is generally applied to the wheel support arm 206, for example by the weight of the seating assembly 58 and/or the occupant 114 (FIG. 1). In some embodiments, the downward force 214 may result in a situation where the wheel 194 may begin to dig into the floor covering 46 such that the seating assembly 58 is more difficult to move about the cabin 34 along the rail system 38. A resilient member 218 may be provided between the load frame 202 and either the anchor 54 or the wheel 194. The resilient member 218 may provide a degree of suspension to the wheel 194 to resist the downward force 214. Due to the wheel support arm 206 being pivotably coupled to the load frame 202 at the suspension pivot 210, the downward force 214 may additionally result in a compressive force 222 that compresses the resilient member 218. As a result, the resilient member 218 provides an opposing force to the compressive force 222 that may aid in retaining suspension of the wheel 194.

Referring again to FIG. 10, the wheel 194 may carry the entirety of the weight of the seating assembly 58 such that the weight is transferred to the floor covering 46, according to some embodiments. The resilient member 218 may generate a lateral force against a side of the anchor 54 that is transferred into the load frame 202 in an equal-and-opposite manner. In response to the lateral force, the downward force 214 may be applied and result in a lifting of the load frame 202 and/or the anchor 54 in a vertical direction. The resilient member 218 may be configured with a strength or spring constant that is sufficient to lift the weight of the seating assembly 58 such that the entirety of the weight of the seating assembly 58 is supported on the wheel 194. The resilient member 218 may be configured to lift the weight of the seating assembly 58 only when the seating assembly 58 is unoccupied.

Referring further to FIG. 10, the seating assembly 58 may further include an electrical conductor 226 that is configured to engage with a conductor 230 such that electrical power is provided to the seating assembly 58. The conductor 230 may be positioned between the rail system 38 and the floor covering 46. The electrical conductor 226 may extend from at least one of the anchors 54 to engage with the conductor 230 as the seating assembly 58 traverses the rail system 38. In some embodiments, the electrical conductor 226 extends from the anchor 54 and trails the wheel 194 to avoid damage to the electrical conductor 226 and/or the conductor 230. The electrical conductor 226 may trail the anchor 54 a distance 234 away from where the wheel 194 contacts the floor covering 46 of at least about 5 mm, at least about 10 mm, at least about 15 mm, at least about 20 mm, less than about 25 mm, less than about 30 mm, less than about 35 mm, less than about 40 mm, and/or combinations and ranges thereof including intermediate values.

Figure 11:
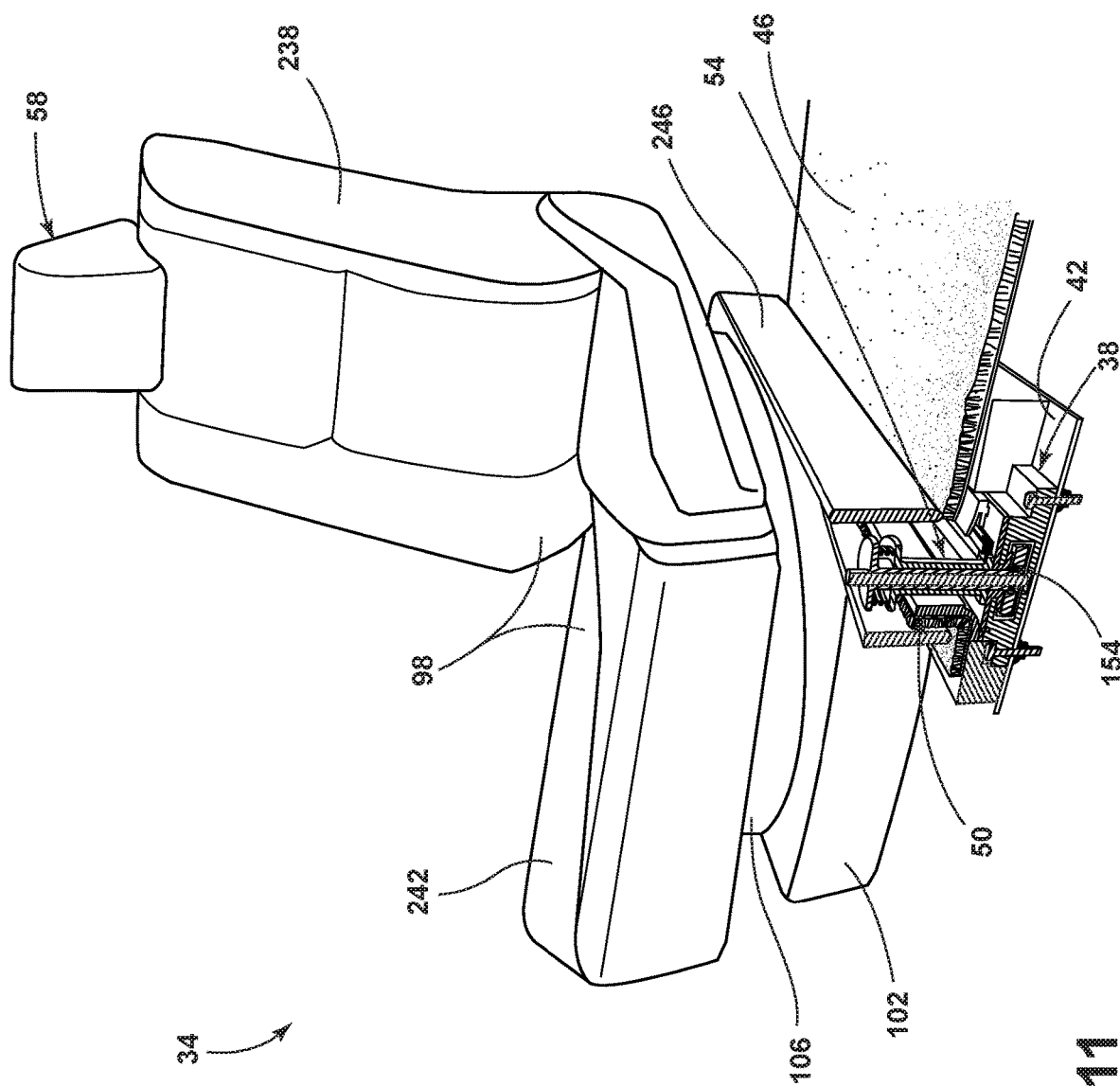
FIG. 11 is a side perspective view of the seating assembly with a partial cross-sectional view of the anchor, according to one embodiment.
Figure 12:
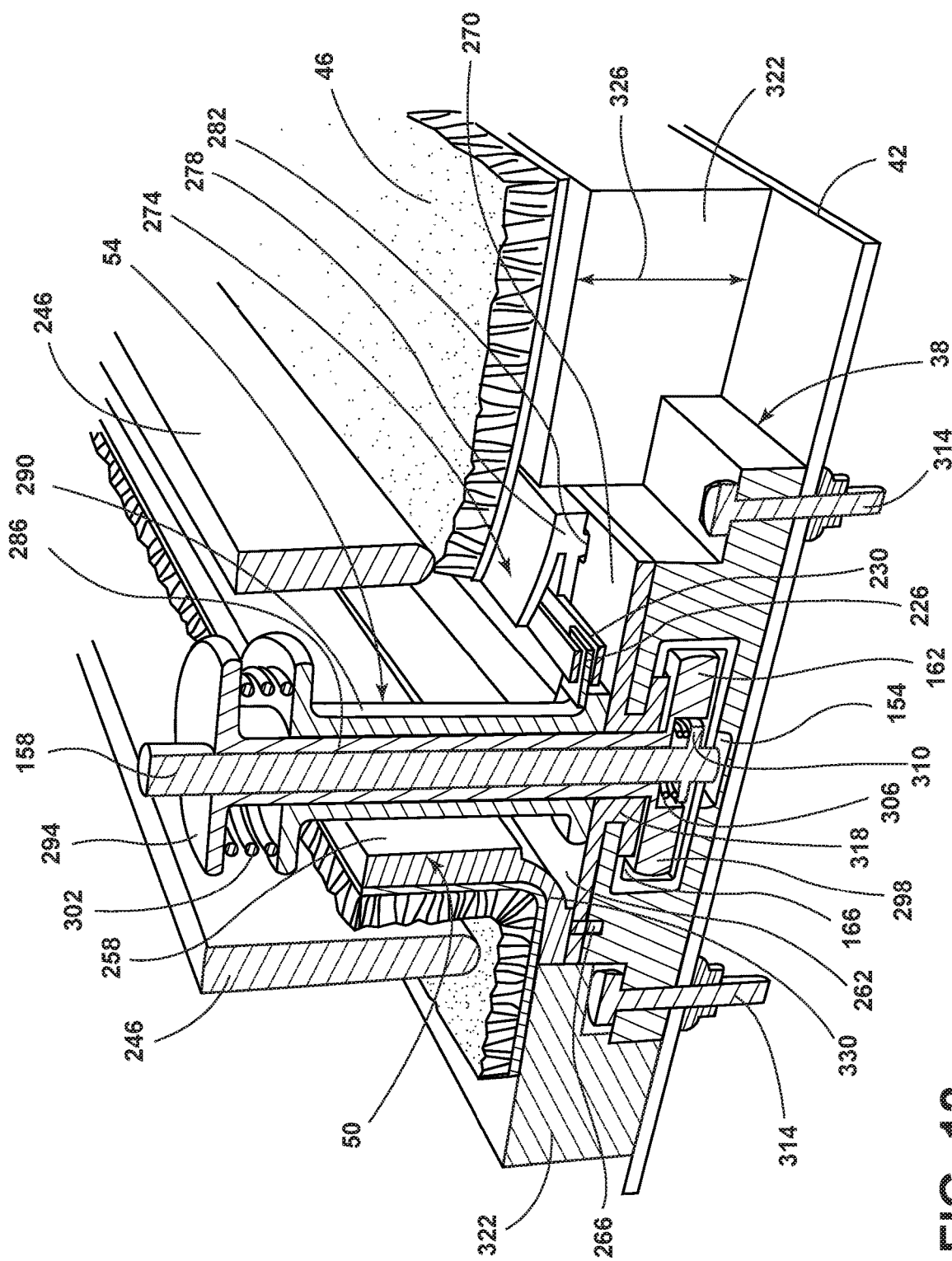
FIG. 12 is an enlarged view of the anchor depicted in FIG. 11.
Figure 14:
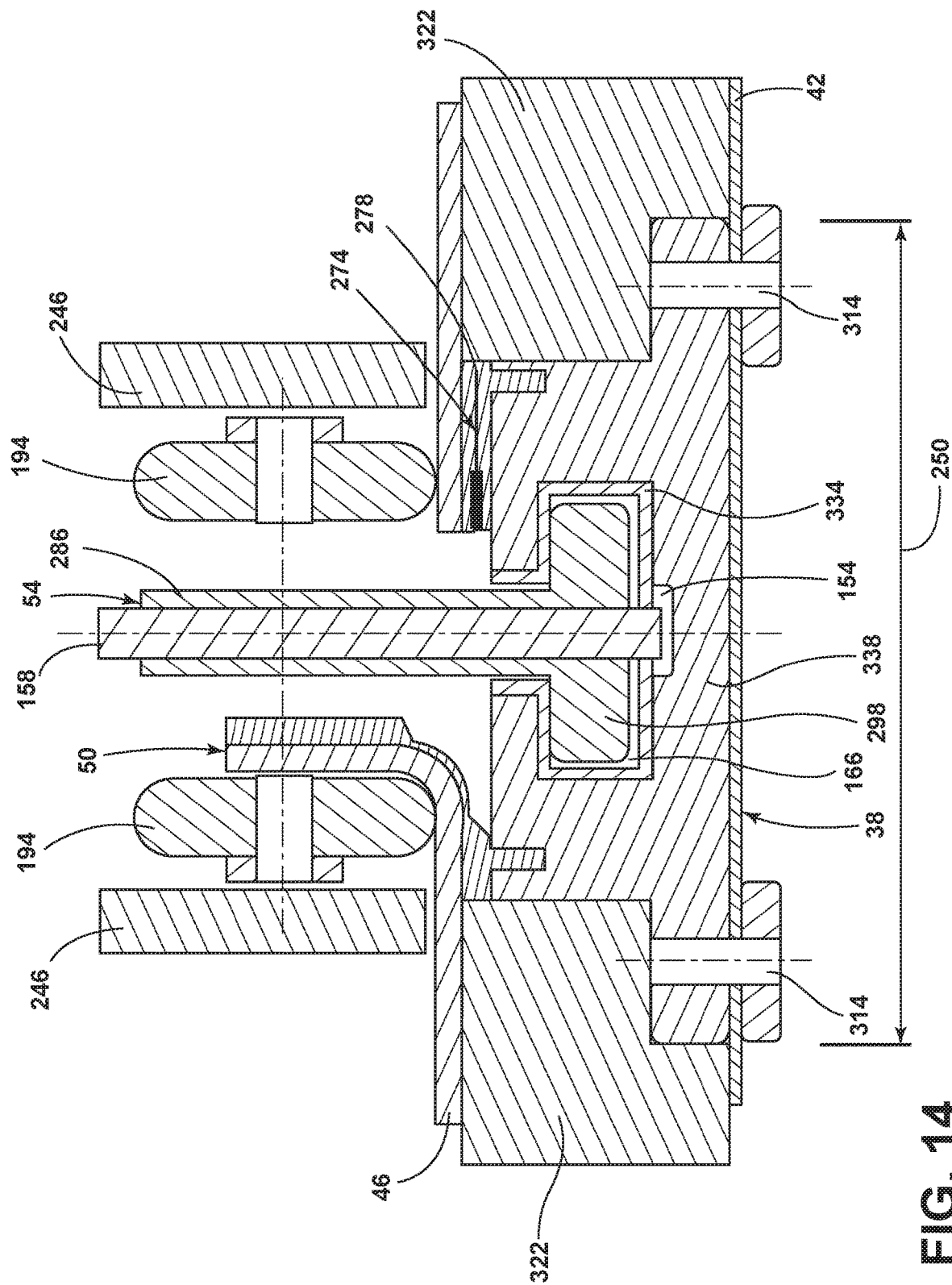
FIG. 14 is a cross-sectional view of the rail system and the anchor, taken along line XIII-XIII of FIG. 9, according to another embodiment.
Figure 17:
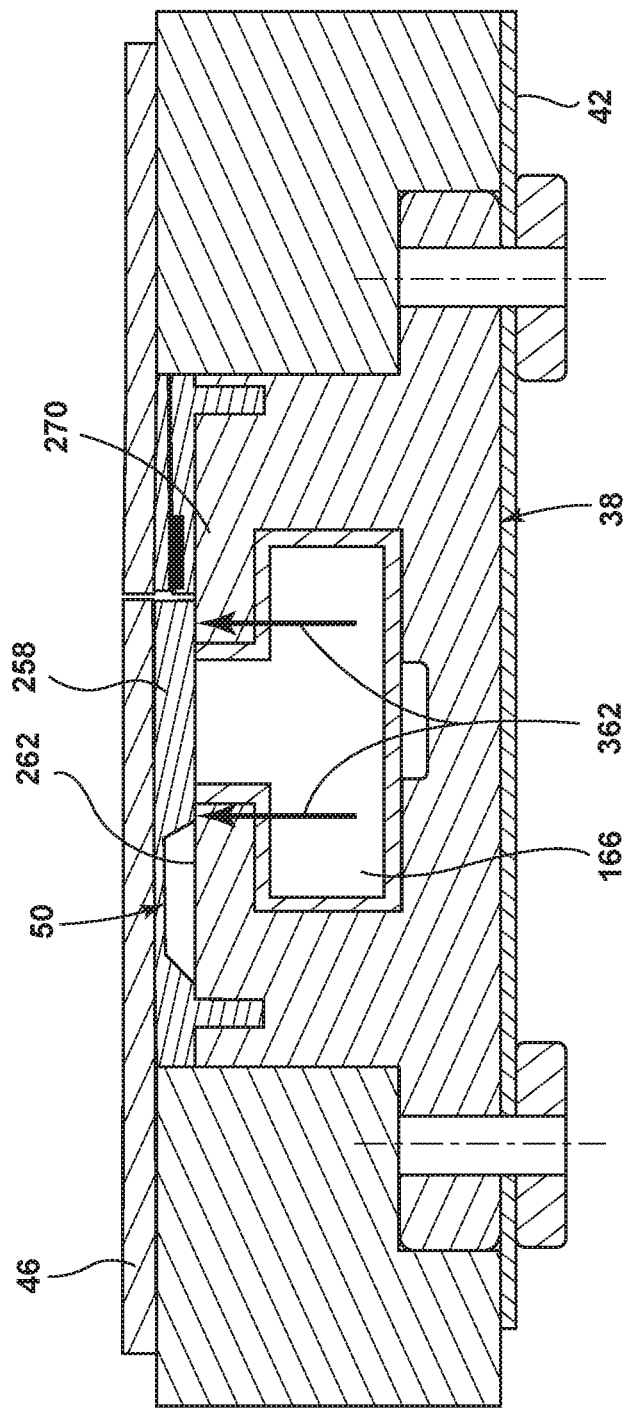
FIG. 17 is a cross-sectional view of the rail system, taken along line XVI-XVI of FIG. 9, illustrating a bridge of a floor covering in a lowered position.

Referring now to FIGS. 11 and 12, the seating assembly 58 may rotate about a vertical axis as a result of the coupling of the pivot mechanism 106 to the comfort structure 98. The comfort structure 98 may include a seatback 238 pivotably coupled to a seat 242. The pivot mechanism 106 may be positioned between the seat 242 and the seat base 102. The seat base 102 of the seating assembly 58 may include a trim portion 246 that is positioned to generally correspond with a width 250 of the rail system 38, as best seen in FIG. 14. The trim portion 246 preferably encloses the anchor 54 such that a user is presented with a smooth and aesthetically pleasing seating assembly 58. Additionally, by enclosing the anchors 54 with the trim portion 246, the anchors 54 and rail system 38 may be protected from debris. In embodiments that utilize the wheel 194, such as those shown in FIGS. 9, 10, and embodiments that are discussed below, the trim portion 246 may additionally enclose the wheel 194 of the anchor 54. In the depicted embodiment, the wheel 194 is not utilized. A plow may be positioned below the floor covering 46 and above the rail system 38 that is operably coupled to an advancing edge of the anchor 54 such that the floor covering 46 and/or the bridge 50 is raised. The trim portion 246 may extend about a circumference of the seat base 102 and ensure that the floor covering 46 and/or the bridge 50 are not raised prematurely while also ensuring the closure of the floor covering 46 and/or bridge 50 once the anchors 54 have passed. Additionally or alternatively, the bridge 50 may be made of a material that is hard and resilient such that once the anchors 54 pass, the restorative force stored in the structure of the bridge 50 forces the bridge 50 to lower over the rail system 38. The bridge 50 is shown in a raised position. The bridge 50 of the floor covering 46 may be operably coupled to the rail system 38. The bridge 50 generally corresponds with the channel 166 that is defined by the vertical leg of the inverted T channel 166 in the rail system 38. The bridge 50 includes a rigid arm 258 that extends over the channel 166 in the rail system 38 such that the floor covering 46 is prevented from entering the channel 166 when the bridge 50 is in a lowered position (FIG. 17). The bridge 50 may be operably coupled to a first side 262 of the rail system 38 by a bridge coupling protrusion 266. The conductor 230 may be positioned between the rail system 38 and the floor covering 46 on a second side 270 of the rail system 38. The first and second sides 262, 270 of the rail system 38 may be separated by the channel 166 such that the bridge 50 and the conductor 230 are positioned on either side of the channel 166.

Referring again to FIGS. 11 and 12, the conductor 230 may further include a housing 274 that is equipped with a living hinge 278. The electrical conductor 226 may separate the housing 274 such that the housing 274 opens about the living hinge 278 to allow an electrical connection between the conductor 230 and the electrical conductor 226, thereby providing the seating assembly 58 with electrical power. The housing 274 may be an elastomeric extrusion that is dirt resistant and includes a rail coupling tab 282 that engages with the rail system 38. The anchor 54 may include a post 286 that is surrounded by a main body 290. In some embodiments, the post 286 extends above and below the main body 290 and terminates in an upper head 294 and a lower head 298. The lower head 298 may alternatively be referred to as the foot 162 of the anchor 54. The post 286 surrounds the locking pin 158. The locking pin 158 can be actuated within the post 286 such that the locking pin 158 may be selectively engaged and disengaged with the locking pin apertures 154 of the rail system 38. The locking pin apertures 154 may alternatively be referred to as positioning apertures. The anchor 54 may be equipped with a first spring 302 that is positioned between the upper head 294 and the main body 290. In some embodiments, the weight of the seating assembly 58 is transferred to the post 286 and/or cushioned by the interaction of the first spring 302 and the upper head 294. Accordingly, the weight of the seating assembly 58 may be substantially supported by the post 286, which interacts with the low friction portion 318. Additionally, the first spring 302 may act in an upward direction on an underside of the upper head 294 such that the main body 290 of the anchor 54 is lifted to suspend the lower head 298 within the rail system 38. A benefit of the depicted embodiment over embodiments that utilize the wheel 194 (e.g., FIG. 10) may be that the main body 290 is capable of immediately transitioning to traveling in a different direction at an intersection of the rail system 38, whereas the wheel 194 may have to caster to a different orientation prior to changing directions. A second spring 306 may be positioned at a lower region of the locking pin 158. The second spring 306 may be configured to bias the locking pin 158 in a downward direction, for example, to engage with one of the locking pin apertures 154. The second spring 306 may be positioned within the lower head 298 of the post 286. The locking pin 158 may further include a shoulder 310 that engages with an underside of the second spring 306. An upper side of the second spring 306 may engage with the lower head 298 of the post 286. The lower head 298 may define a recessed area in an underside thereof that is configured to receive the second spring 306 and the shoulder 310. At least a portion of the locking pin 158 extends below the lower head 298 such that the locking pin 158 engages with the locking pin apertures 154. The first spring 302 and the second spring 306 may act in opposing directions relative to one another. Said another way, the restorative force of the first spring 302 may oppose the restorative force of the second spring 306.

Referring further to FIGS. 11 and 12, in some embodiments, the first spring 302 provides a cushioning or dampening of sudden movements that may be caused by obstructions in a road the vehicle is traveling on. For example, the upper head 294 of the post 286 may be operably coupled to, or integrally formed with, the seat base 102 such that additional cushioning is provided to the seating assembly 58. In such an embodiment, the locking pin 158 may be actuated by a manual lever or by a powered mechanism that is operably coupled to the locking pin 158. The anchor 54 may be configured in a generally cylindrical fashion such that the anchor 54 may be rotated within the rail system 38. In some embodiments, the electrical conductor 226 that is operably coupled to the anchor 54 is generally disc shaped and extends in a continuous fashion radially outward from a circumference of the anchor 54 such that the electrical connector 226 may engage with the conductor 230 regardless of a rotational position of the anchor 54. The rail system 38 may be operably coupled to the floor pan 42 by one or more fasteners 314. The rail system 38 may include a low friction portion 318 that extends from a top surface of the rail system 38 into the inverted T channel 166 such that an upper surface of the lower head 298, an exterior surface of the post 286, and an underside of the main body 290 may contact the low friction portion 318 thereby reducing the work or effort necessary to move the seating assembly 58 along the rail system 38. The floor pan 42 and the floor covering 46 may be separated by a fill layer 322. A thickness 326 of the fill layer 322 may generally correspond to a height of the rail system 38. The height of the rail system 38 may be inclusive of the bridge 50 and the housing 274 of the conductor 230. The bridge 50 and the housing 274 of the conductor 230 may have similar or equal thicknesses.

Figure 13:
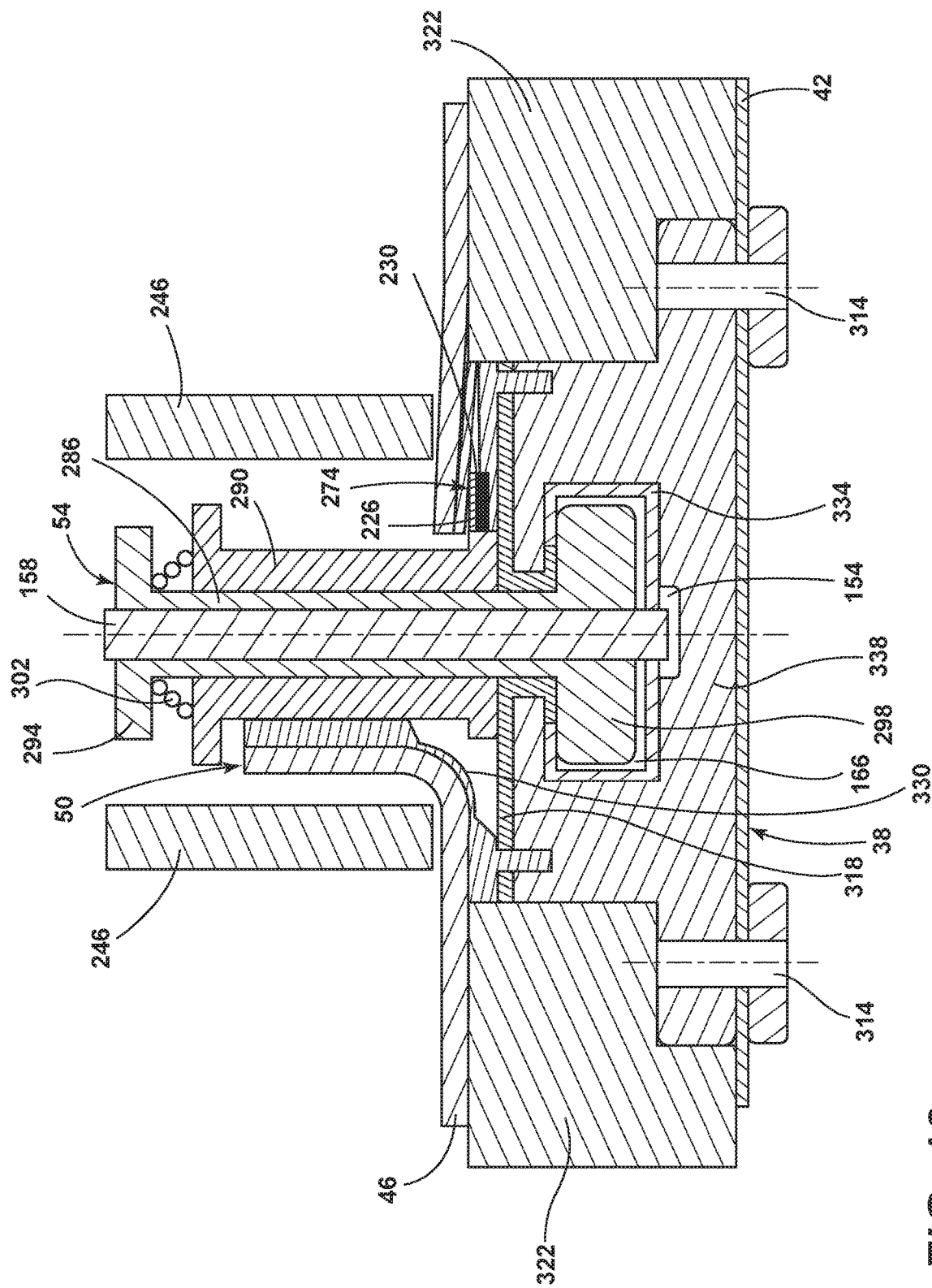
FIG. 13 is a cross-sectional view of the rail system and the anchor, taken along line XIII-XIII of FIG. 9, according to one embodiment.

Referring to FIG. 13, the anchor 54 may utilize the first spring 302 while omitting the second spring 306 (FIG. 12). Similar to the previous embodiment in FIG. 12, the first spring 302 may aid in actuation of the locking pin 158 or may provide additional cushioning to the seating assembly 58. The anchor 54 is configured to displace the bridge 50 as the anchors 54 traverse the rail system 38. The bridge 50 may be displaced by the anchor 54 such that the bridge 50 pivots in an upward direction about a flexible section 330 to the raised position. While pivoted in the upward direction the bridge 50 may contact an interior surface of the trim portion 246 and/or an external surface of the main body 290 of the anchor 54. The first spring 302 may be positioned between the upper head 294 of the post 286 and an upper surface of the main body 290. The main body 290 of the anchor 54 may rest upon the low friction portion 318 of the rail system 38. Additionally, the construction of the anchor 54 may be such that the lower head 298 of the post 286 is vertically offset from a lower surface of the channel 166. Accordingly, a majority of the weight of the seating assembly 58 may be supported by the main body 290 such that movement of the seating assembly 58 along the rail system 38 is possible with substantially less effort than would be required if the lower head 298 supported the majority of the weight of the seating assembly 58 and the lower head 298 contacted a bottom surface of the channel 166. Said another way, the majority of the weight of the seating assembly 58 is supported by components that experience relatively low friction or resistance to motion (e.g., rolling friction versus sliding friction, low friction material interactions, etc.).

Referring again to FIG. 13, the locking pin 158 may be actuated within the post 286 and/or the lower head 298 manually or by utilizing a powered mechanism such that the locking pin 158 selectively engages with the locking pin apertures 154 as the seating assembly 58 traverses the various positions along the rail system 38. In the depicted embodiment, the conductor 230 is positioned on the rail system 38 to be radially inward of the trim portion 246. The trim portion 246 may be positioned above the housing 274 of the conductor 230 such that increased positive contact is maintained between the conductor 230 and the electrical conductor 226 as the seating assembly 58 traverses the rail system 38. The fill layer 322 is positioned between the floor covering 46 and the floor pan 42. The floor pan 42 may be constructed of a hard and rigid material, such as steel. The rail system 38 may be operably coupled to the floor pan 42 by the fasteners 314. The fasteners 314 may be, but are not limited to, weld nuts, bolts, rivets, or the rail system 38 may be integrally formed with the floor pan 42. The rail system 38 may be constructed from various materials. For example, in one embodiment the rail system 38 may be constructed of a steel rail 334 that defines at least a portion of the channel 166 and the steel rail 334 may be positioned within an aluminum rail 338 that makes up a majority of the remainder of the rail system 38.

Figure 15:
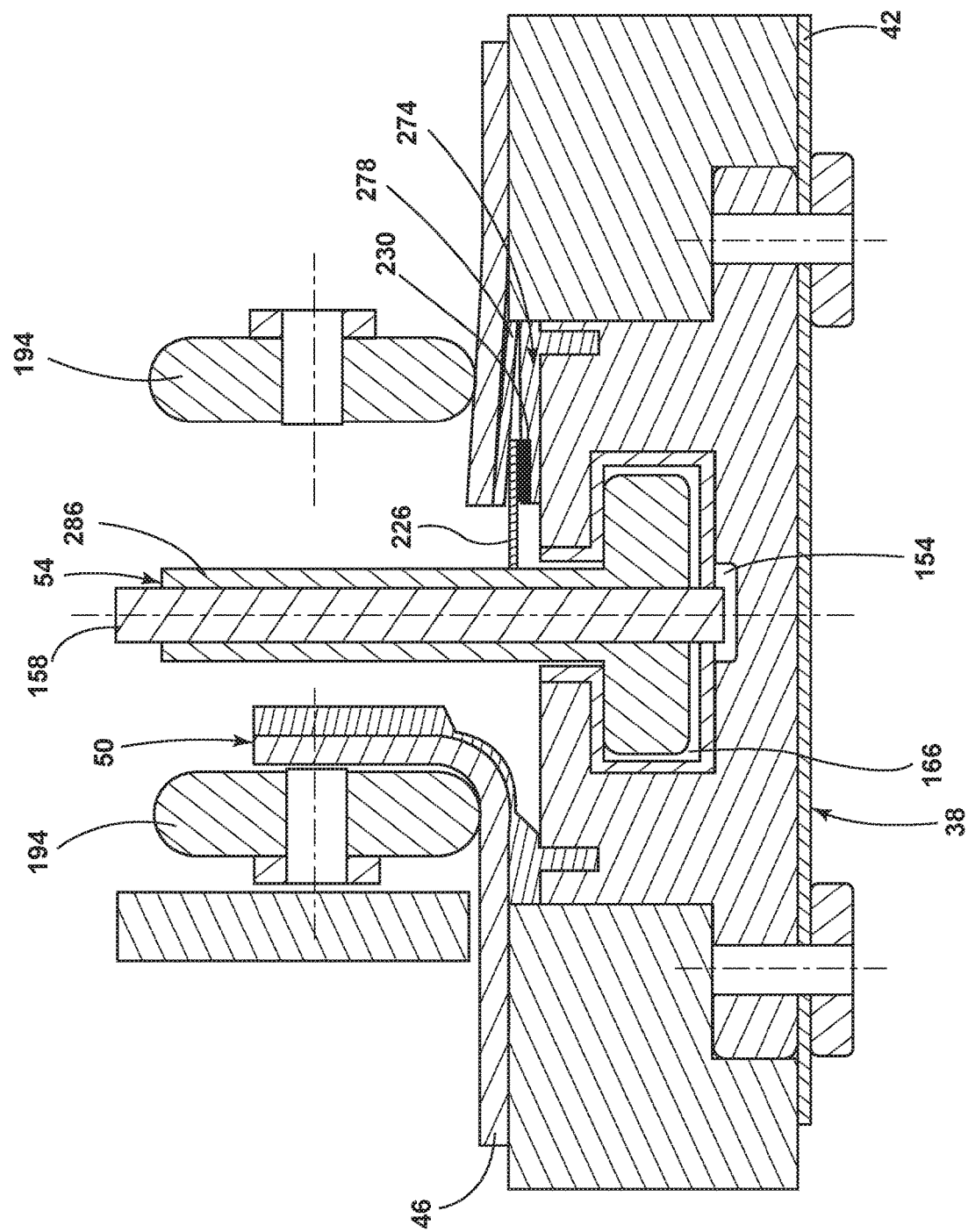
FIG. 15 is a cross-sectional view of the rail system and the anchor, taken along line XIII-XIII of FIG. 9, according to a further embodiment.

Referring now to FIGS. 14 and 15, the wheels 194 are operably coupled to the trim portion 246 such that one of the wheels 194 is generally positioned over the conductor 230 thereby providing a compressive force that may improve electrical contact between the electrical conductor 226 and the conductor 230. The depicted embodiment omits the first spring 302 and the second spring 306. The locking pin 158 is positioned within the post 286 and may be actuated between a raised position and a lowered position. The electrical conductor 226 extends from an exterior surface of the post 286. As the electrical conductor 226 passes through the conductor 230, the housing 274 of the conductor 230 is separated and opens about the living hinge 278 thereby establishing an electrical connection between the electrical conductor 226 and the conductor 230. In the depicted embodiment, the wheels 194 may support a majority of the weight of the seating assembly 58 while suspending the lower head 298 of the post 286 above the lower surface of the channel 166. Accordingly, the seating assembly 58 may be moved around the rail system 38 with less effort than if the lower head 298 rested upon the lower surface of the channel 166. The locking pin 158 may be placed in the lowered position when the anchor 54 is positioned above the locking pin aperture 154 and the locking pin 158 is aligned with the locking pin aperture 154. In embodiments that include the structure as shown and described in FIG. 10, the weight of the seating assembly 58 may be transferred into the wheel 194 and ultimately into the floor covering 46 to prevent the lower head 298 from contacting the steel rail 334. In such embodiments, the anchor 54 is prevented from binding in the rail system 38 as the surface of the lower head 298 and the steel rail 334 may not be provided with the low friction portion 318.

Figure 16:
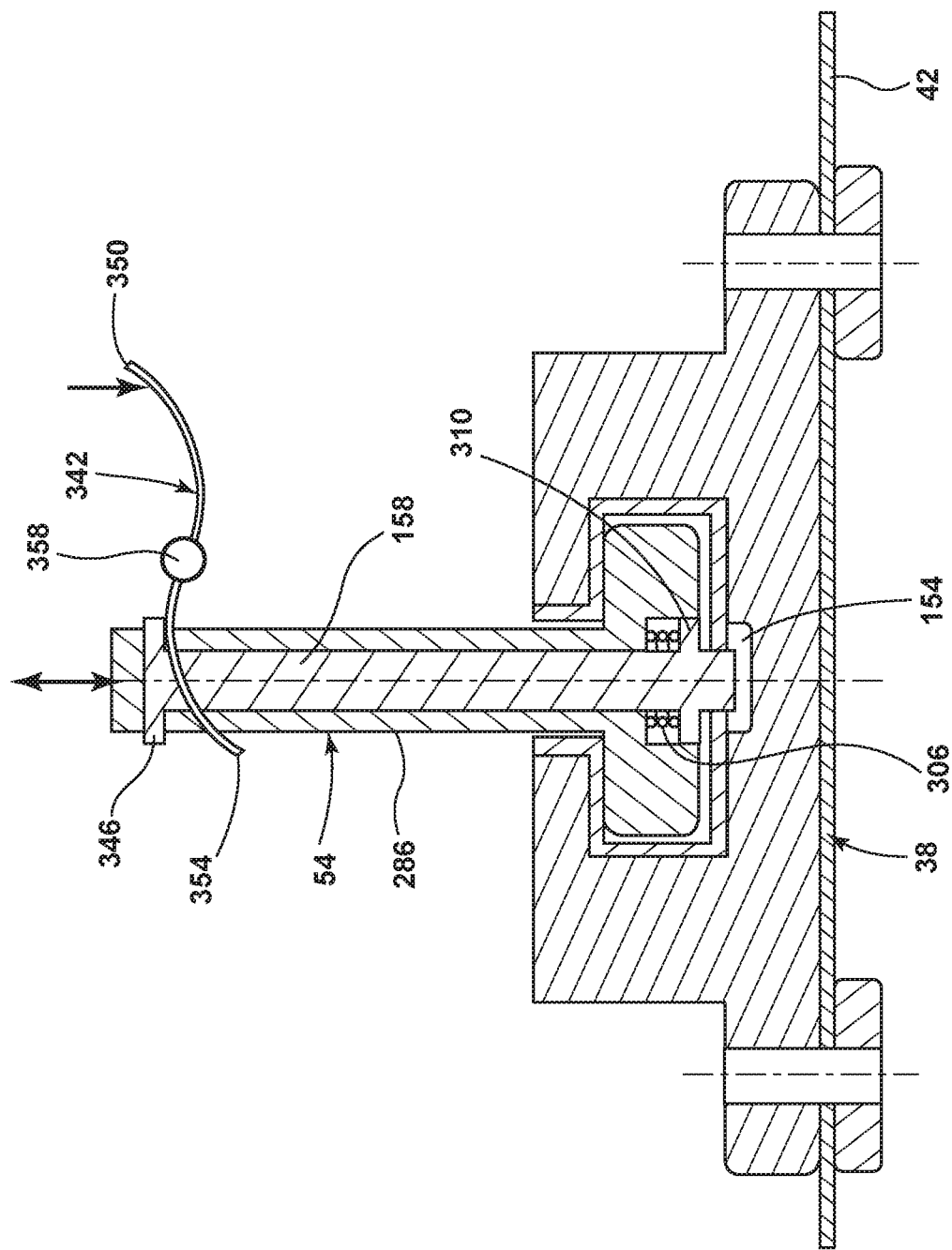
FIG. 16 is a cross-sectional view of the rail system and the anchor, taken along line XVI-XVI of FIG. 9, according to one embodiment.

Referring to FIG. 16, the rail system 38 is shown operably coupled to the floor pan 42 and having the anchor 54. According to various embodiments of the present disclosure, the locking pin 158 may be actuated within the post 286 of the anchor 54. For example, the locking pin 158 may be actuated in a vertical direction manually or by a powered mechanism. The depicted embodiment illustrates one example of how the locking pin 158 may be actuated and may be applicable to manual and/or powered operation of the depicted mechanism. A lever 342 may engage with an underside of a platform 346 such that actuation of the lever 342 may raise the locking pin 158 out of the locking pin aperture 154. For example, the lever 342 may have a generally sinusoidal shape such that downward actuation of the lever 342 at a first end 350 induces upward motion of the lever 342 at a second end 354, which is translated into vertical motion of the locking pin 158. The lever 342 may have a pivot point 358 located between the first end 350 and the second end 354. For example, the pivot point 358 may be generally located at a center of a length of the lever 342.

Referring now to FIG. 17, the rail system 38 is shown without an anchor 54 and depicts the bridge 50 of the floor covering 46 in a lowered or rest position. The rigid arm 258 of the bridge 50 spans the opening defined by the vertical leg of the channel 166 and contacts both the first side 262 and second side 270 of the rail system 38. By so covering the channel 166, the bridge 50 and floor covering 46 prevent debris, obstacles, and other items from entering the channel 166 that are not intended to be located within the channel 166. Additionally, a user is presented with a substantially level and substantially continuous surface of the floor covering 46 thereby eliminating tripping hazards and presenting the user with an aesthetically pleasing cabin 34. Further, the positioning and composition of the rigid arm 258 are such that upon application of pressure to the floor covering 46 directly above the channel 166, the bridge 50 is supported by the rail system 38 and prevented from entering the channel 166. The bridge 50 is prevented from entering the channel 166 as a result of an opposing force to the applied pressure which is provided at contact points 362 between the rail system 38 and the bridge 50.

Figure 18:
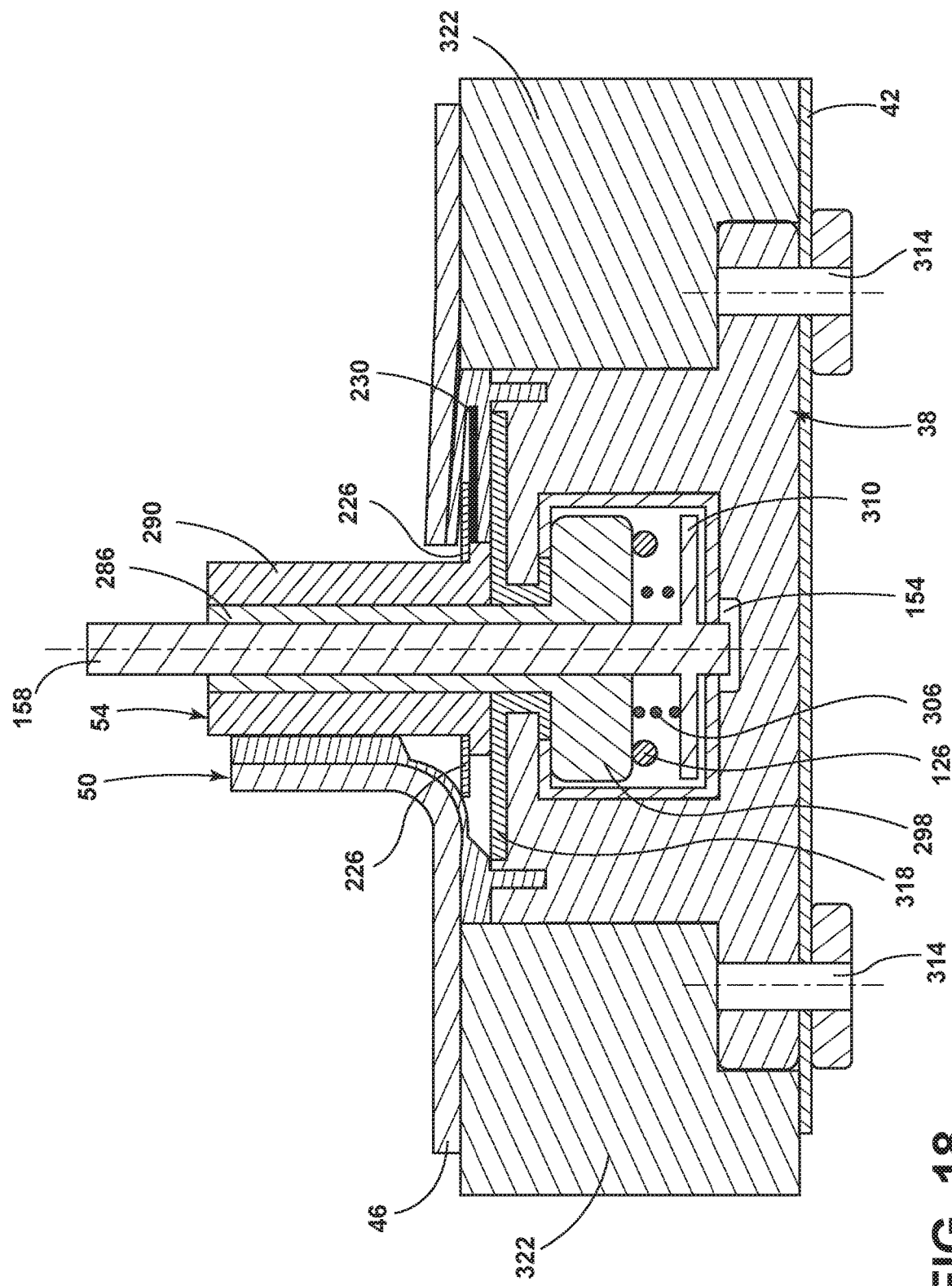
FIG. 18 is a cross-sectional view of the rail system and the anchor, taken along line XIII-XIII of FIG. 9, illustrating a locking pin in a lowered position and a drive cable, according to one embodiment.
Figure 19:
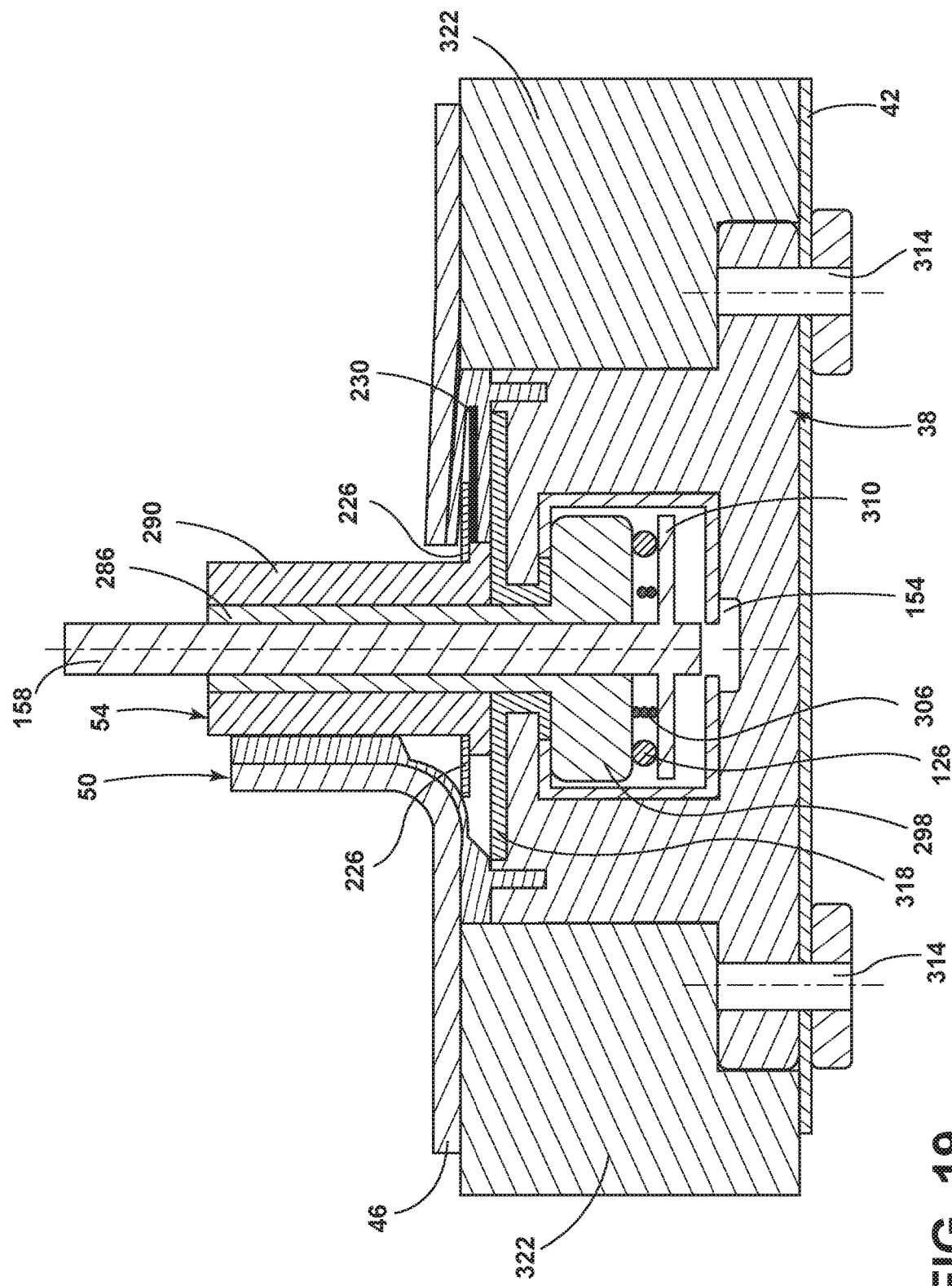
FIG. 19 is a cross-sectional view of the rail system and the anchor, taken along line XIII-XIII of FIG. 9, illustrating the locking pin in a raised position and the drive cable, according to another embodiment.

Referring to FIGS. 18 and 19, the locking pin 158 is shown in the lowered position (FIG. 18) and a raised position (FIG. 19). The locking pin 158 may also be placed in an intermediate position where the locking pin 158 is disengaged from the locking pin aperture 154 but not yet engaged to the drive cable 126. The depicted embodiment employs the drive cable 126. The drive cable 126 may be positioned between the lower head 298 of the post 286 and the shoulder 310 of the locking pin 158. The drive cable 126 may be positioned radially outward of the second spring 306. The second spring 306 is positioned between the lower head 298 and the shoulder 310 with the locking pin 158 passing through a center of the second spring 306. When the locking pin 158 is in the lowered position, the seating assembly 58 is disengaged from the drive cable 126 and is locked to the rail system 38. Accordingly, when the locking pin 158 is in the lowered position the seating assembly 58 is stationary on the rail system 38. As the locking pin 158 is actuated in an upward direction, the drive cable 126 becomes sandwiched between the lower head 298 and the shoulder 310. More specifically, the drive cable 126 engages with the seating assembly 58 when the shoulder 310 of the locking pin 158 compresses the second spring 306 and ultimately sandwiches the drive cable 126 between the lower head 298 and the shoulder 310. Upon engagement of the seating assembly 58 to the drive cable 126 by way of the anchor 54, the seating assembly 58 may begin to traverse the rail system 38 since the action of engaging the drive cable 126 simultaneously disengages the locking pin 158 from the locking pin aperture 154. The depicted embodiment may share some or all of the features described herein for alternative embodiments of the various components depicted. For example, the electrical conductor 226 extends radially outward from an external surface of the main body 290 of the anchor 54, the main body 290 surrounds the post 286, the fasteners 314 couple the rail system 38 to the floor pan 42, the low friction portion 318 is employed, the fill layer 322 fills space between the floor covering 46 and the floor pan 42, and so on.

Figure 20:
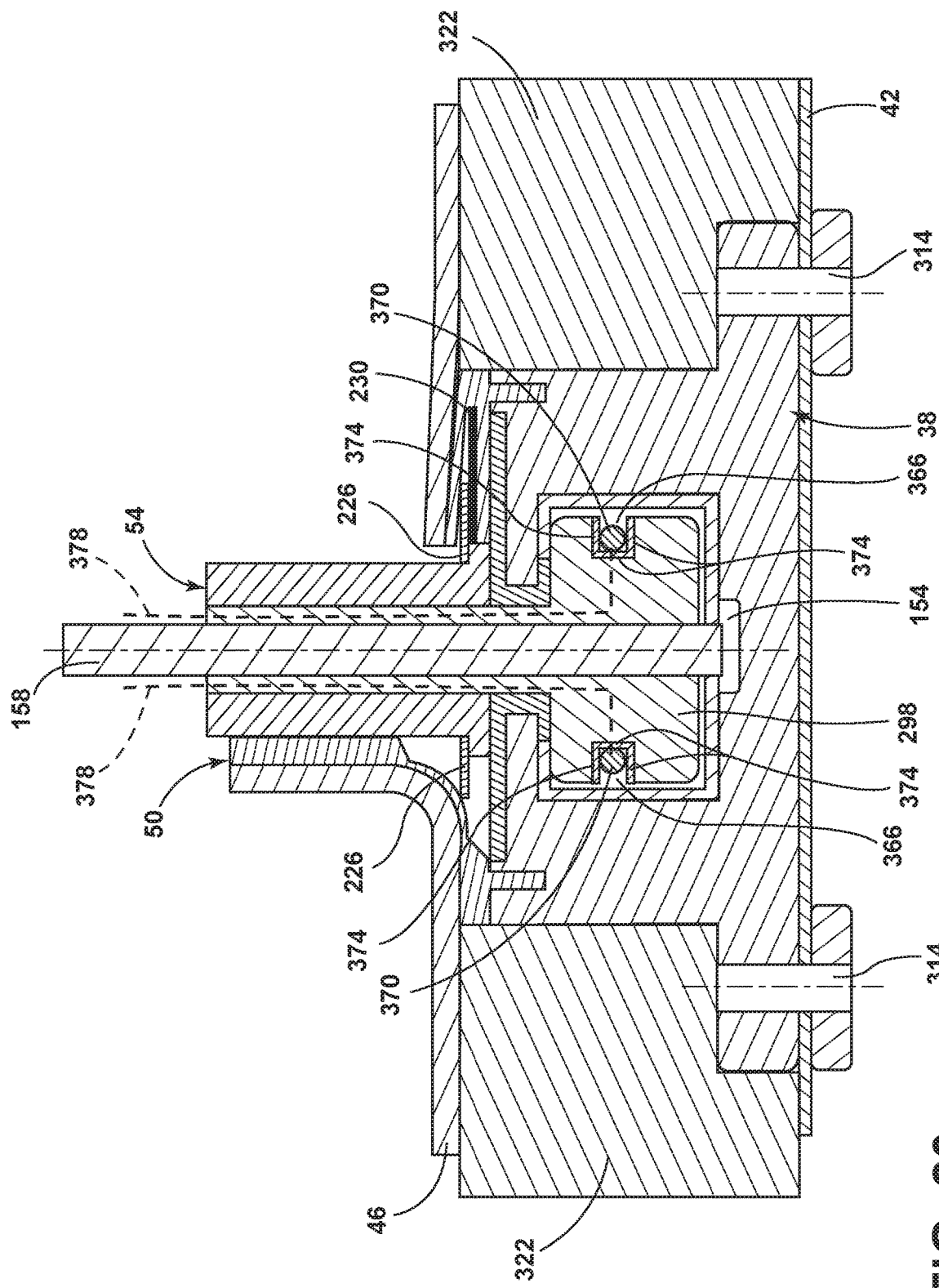
FIG. 20 is a cross-sectional view of the rail system and the anchor, taken along line XIII-XIII of FIG. 9, illustrating a data cable, according to one embodiment.

Referring now to FIG. 20, the seating assembly 58 may further include an alcove 366 in at least one side of the lower head 298 of the anchor 54. The alcove 366 may receive a data cable 370 that is configured to send and receive data relating to the positioning of the seating assembly 58. The alcove 366 may include one or more data readers 374 that are operably coupled to a data path 378 of the seating assembly 58. The data path 378 may be routed through the anchor 54 up to the seat base 102 (FIG. 11) where the data path 378 may then branch out to various sensors and controllers. Data relating to the configuration of the seating assembly 58 may be transmitted to, and received from, the data cable 370 by the data readers 374. Data received from the data cable 370 by the seating assembly 58 may include, but is not limited to, commands relating to a pitch angle of the seatback 238 relative to the seat 242, a rotational position of the pivot mechanism 106 (FIG. 11), heating or ventilation information to provide a heated or cooled surface to the seating assembly 58, commands to prepare the seating assembly 58 for translation along the rail system 38, commands to execute a translation of the seating assembly 58 along the rail system 38, and the like. Data transmitted from the seating assembly 58 to the data cable 370 may include, but is not limited to, an occupied status of the seating assembly 58, a current pitch angle of the seatback 238 relative to the seat 242, a position of the seating assembly 58 on the rail system 38, a temperature of the surface of the seating assembly 58, a current rotational position of the pivot mechanism 106, general information relating to the configuration of various components on the seating assembly 58, and the like. Data may be transferred to and from the data cable 370 by near field data transfer. By using near field data transfer, contact conduction noise, wear of the data cable 370, and wear of the data readers 374 is mitigated or avoided entirely. The data cable 370 may be configured to send and receive data from more than one seating assembly 58 at a time thereby eliminating the use of multiple data cables 370 that may otherwise be required in designs that utilize one cable per seating assembly. Accordingly, crossing and tangling issues that may arise in multiple cable set ups are avoided, particularly when negotiating corners of the rail system 38. Further, large seating capacity vehicles may present packaging difficulties for systems that utilize one data cable 370 per seating assembly 58, which is an issue that the present disclosure does not encounter.

Vehicles 30 are often provided with seating assemblies that can be adjusted for occupant 114 comfort. Some seating assemblies in vehicles 30 are capable of translation in fore-aft or side-to-side directions. However, conventional seating assemblies are typically not capable of translation to various locations within the cabin 34 of the vehicle 30. Components of the cabin 34 of the vehicle 30 disclosed herein, such as the rail system 38, the seating assembly 58, the drive cable 126, and the data cable 370 provide a user with a reconfigurable cabin 34. The seating assemblies 58 and other components coupled to the rail system 38 may be repositioned, reorganized, or reordered to assume various configurations that are suitable for the user's desired purpose.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly, comprising:
an anchor having a post that is surrounded by a main body, wherein the post extends above and below the main body and terminates in an upper head and a lower head, wherein the post surrounds a locking pin that can be actuated within the post, wherein the anchor engages with a rail system, the rail system comprising a conductor that is provided with electrical power and is configured to receive the electrical connector; and
an electrical connector that extends outward from the anchor.

2. The seating assembly of claim 1, wherein the electrical connector is generally circular in shape such that the electrical connector remains coupled to the conductor regardless of a rotational position of the anchor.

3. The seating assembly of claim 1, wherein the rail system comprises a low friction portion.

4. The seating assembly of claim 3, wherein the rail system further comprises a plurality of positioning apertures that are configured to receive the locking pin.

5. The seating assembly of claim 1, further comprising:
a first spring positioned between the upper head and the main body and configured to aid in actuating the locking pin.

6. The seating assembly of claim 5, further comprising:
a second spring positioned at a lower region of the locking pin and configured to bias the locking pin in a downward direction.

7. The seating assembly of claim 6, wherein the second spring is positioned within the lower head of the post.

8. The seating assembly of claim 6, wherein the locking pin further comprises a shoulder that engages with an underside of the second spring.

9. A seating assembly, comprising:
an anchor having a post that is surrounded by a main body, wherein the post extends above and below the main body and terminates in an upper head and a lower head, and wherein the post surrounds a locking pin that can be vertically actuated within the post;
an alcove in at least one side of the lower head of the anchor, wherein the alcove receives a data cable that is configured to send and receive data relating to a positioning of the seating assembly; and
an electrical connector that extends outward from the anchor such that an electrical connection is established with the seating assembly.

10. The seating assembly of claim 9, wherein the alcove further comprises:
one or more data readers that are operably coupled to a data path such that data relating to a configuration of the seating assembly is transmitted to and received from the data cable.

11. A seating assembly, comprising:
an anchor having a post that is surrounded by a main body, wherein the post extends above and below the main body and terminates in an upper head and a lower head, and wherein the post surrounds a locking pin that can be actuated within the post;
an alcove in at least one side of the lower head of the anchor, wherein the alcove receives a data cable that is configured to send and receive data relating to a positioning of the seating assembly, and wherein the alcove comprises one or more data readers that are operably coupled to a data path such that data relating to a configuration of the seating assembly is transmitted to and received from the data cable; and
a first spring positioned between the upper head and the main body and configured to aid in actuating the locking pin.

12. The seating assembly of claim 11, wherein the anchor engages with a rail system that has a plurality of positioning apertures that are configured to receive the locking pin.

13. The seating assembly of claim 12, further comprising:
a second spring positioned at a lower region of the locking pin and configured to bias the locking pin in a downward direction.

14. The seating assembly of claim 13, wherein the second spring is positioned within the lower head of the main body.

15. The seating assembly of claim 14, wherein the locking pin further comprises a shoulder that engages with an underside of the second spring.

* * * * *